(12) United States Patent
Moridaira et al.

(10) Patent No.: US 7,761,184 B2
(45) Date of Patent: Jul. 20, 2010

(54) ROBOT APPARATUS AND CONTROL METHOD THEREOF

(75) Inventors: Tomohisa Moridaira, Tokyo (JP); Seiji Tamura, Tokyo (JP)

(73) Assignee: Sony Corporation, Tokyo (JP)

( * ) Notice: Subject to any disclaimer, the term of this patent is extended or adjusted under 35 U.S.C. 154(b) by 988 days.

(21) Appl. No.: 10/805,708

(22) Filed: Mar. 22, 2004

(65) Prior Publication Data

US 2004/0236469 A1    Nov. 25, 2004

(30) Foreign Application Priority Data

Mar. 23, 2003   (JP)   ............................. 2003-122887

(51) Int. Cl.
  *G06F 19/00*    (2006.01)
  *G05B 19/04*    (2006.01)
  *G05B 19/418*   (2006.01)

(52) U.S. Cl. ................. 700/245; 700/261; 700/246; 700/247; 700/248; 700/250; 318/568.12; 318/568.17; 318/800

(58) Field of Classification Search .................. None
  See application file for complete search history.

(56) References Cited

U.S. PATENT DOCUMENTS

| 5,349,277 | A  | * | 9/1994  | Takahashi et al. | ...... 318/568.12 |
| 6,321,140 | B1 | * | 11/2001 | Fujita et al.    | ......... 700/248 |
| 6,330,494 | B1 | * | 12/2001 | Yamamoto         | ......... 700/261 |
| 6,421,585 | B1 | * | 7/2002  | Takamura         | ......... 700/245 |
| 6,463,356 | B1 | * | 10/2002 | Hattori et al.   | ......... 700/245 |
| 6,567,724 | B2 | * | 5/2003  | Yamamoto         | ......... 700/261 |
| 6,902,015 | B2 | * | 6/2005  | Furuta et al.    | ........... 180/8.6 |
| 6,961,640 | B2 | * | 11/2005 | Kuroki et al.    | ......... 700/245 |
| 6,999,851 | B2 | * | 2/2006  | Kato et al.      | ......... 700/245 |
| 7,076,338 | B2 | * | 7/2006  | Kuroki et al.    | ......... 700/254 |

FOREIGN PATENT DOCUMENTS

JP         6 138941        5/1994
JP       2000 158378       6/2000

* cited by examiner

*Primary Examiner*—Khoi Tran
*Assistant Examiner*—Ian Jen
(74) *Attorney, Agent, or Firm*—Frommer Lawrence & Haug LLP; William S. Frommer; Thomas F. Presson

(57) ABSTRACT

A robot apparatus capable of offering significantly improved safety and a control method thereof by detecting a safety level status and a safety level of the safety level status and then, in response, taking prescribed countermeasures. In addition, in a movable robot apparatus and its control method, a safety level status detecting means for detecting a safety level status and a control means for performing a control process so as to implement prescribed countermeasures depending on the position of the safety level status detected by the safety level status detecting means are provided. Further, in a robot apparatus and its control method, a safety level involving an object and movable parts is detected when the object is detected, and the movable parts are moved so as to mitigate or avoid the danger based on the detected safety level and a determined action.

16 Claims, 34 Drawing Sheets

SINGLE JOINT

| SPACE | SENSOR | POSITION OF SENSOR | RELEVANT JOINT | THRESHOLD VALUE 1 | THRESHOLD VALUE 2 | THRESHOLD VALUE 3 | EMERGENCY PREVENTION AMOUNT | COUNTERMEASURE TYPE |
|---|---|---|---|---|---|---|---|---|
| SPACE ON THE OUTSIDE OF LEFT HIP | TACT SWITCH 1 | OUTSIDE OF LEFT HIP | ROLL AXIS OF LEFT HIP | $m_1(S_i)$ | $n_1(S_i)$ | — | — | TABLE 2 |
| SPACE ON THE OUTSIDE OF RIGHT HIP | TACT SWITCH 2 | OUTSIDE OF RIGHT HIP | ROLL AXIS OF RIGHT HIP | $m_2(S_i)$ | $n_2(S_i)$ | — | — | TABLE 2 |
| SPACE AT THE BACK OF LEFT KNEE | SURFACE CONTACT SWITCH 1 | BACK OF LEFT KNEE | LEFT KNEE (PITCH AXIS) | $m_3(S_i)$ | $n_3(S_i)$ | $\ell_1(S_i)$ | $p_1(S_i)$ | TABLE 2 |
| SPACE AT THE BACK OF RIGHT KNEE | SURFACE CONTACT SWITCH 2 | BACK OF RIGHT KNEE | RIGHT KNEE (PITCH AXIS) | $m_4(S_i)$ | $n_4(S_i)$ | $\ell_2(S_i)$ | $p_2(S_i)$ | TABLE 2 |
| SPACE FORMED BY LEFT SHIN AND LEFT INSTEP | TACT SWITCH 3 | LEFT SHIN | PITCH AXIS OF LEFT ANKLE | $m_5(S_i)$ | $n_5(S_i)$ | — | — | TABLE 2 |
| SPACE FORMED BY RIGHT SHIN AND RIGHT INSTEP | TACT SWITCH 4 | RIGHT SHIN | PITCH AXIS OF RIGHT ANKLE | $m_6(S_i)$ | $n_6(S_i)$ | — | — | TABLE 2 |
| SPACE ON THE OUTSIDE OF LEFT ANKLE | TACT SWITCH 5 | OUTSIDE OF LEFT ANKLE | ROLL AXIS OF LEFT ANKLE | $m_7(S_i)$ | $n_7(S_i)$ | — | — | TABLE 2 |
| SPACE ON THE OUTSIDE OF RIGHT ANKLE | TACT SWITCH 6 | OUTSIDE OF RIGHT ANKLE | ROLL AXIS OF RIGHT ANKLE | $m_8(S_i)$ | $n_8(S_i)$ | — | — | TABLE 2 |
| SPACE UNDER LEFT ARMPIT | SURFACE CONTACT SWITCH 3 | LEFT ARMPIT | ROLL AXIS OF LEFT SHOULDER | $m_9(S_i)$ | $n_9(S_i)$ | — | — | TABLE 1 |
| SPACE UNDER RIGHT ARMPIT | SURFACE CONTACT SWITCH 4 | RIGHT ARMPIT | ROLL AXIS OF RIGHT SHOULDER | $m_{10}(S_i)$ | $n_{10}(S_i)$ | — | — | TABLE 1 |
| SPACE FORMED BY LEFT UPPER ARM AND LEFT FOREARM | SURFACE CONTACT SWITCH 5 | LEFT ELBOW | LEFT ELBOW (PITCH AXIS) | $m_{11}(S_i)$ | $n_{11}(S_i)$ | — | — | TABLE 1 |
| SPACE FORMED BY RIGHT UPPER ARM AND RIGHT FOREARM | SURFACE CONTACT SWITCH 6 | RIGHT ELBOW | RIGHT ELBOW (PITCH AXIS) | $m_{12}(S_i)$ | $n_{12}(S_i)$ | — | — | TABLE 1 |

FIG. 22

| PLURAL LINKS | | | | | | | | |
|---|---|---|---|---|---|---|---|---|
| SPACE | SENSOR | POSITION OF SENSOR | RELEVANT JOINT | THRESHOLD VALUE 1 | THRESHOLD VALUE 2 | THRESHOLD VALUE 3 | EMERGENCY PREVENTION AMOUNT | COUNTERMEASURE TYPE |
| SPACE ON THE INSIDE OF LEGS ABOVE KNEE | SURFACE CONTACT SWITCH 7 SURFACE CONTACT SWITCH 8 | OUTSIDE OF LEFT HIP OUTSIDE OF RIGHT HIP | YAW AXIS OF LEFT HIP ROLL AXIS OF LEFT HIP YAW AXIS OF RIGHT HIP ROLL AXIS OF RIGHT HIP | $m_{13}(Si)$ | $n_{13}(Si)$ | — | — | TABLE 2 |
| SPACE ON THE INSIDE OF LEGS UNDER KNEE | SURFACE CONTACT SWITCH 9 SURFACE CONTACT SWITCH 10 | INSIDE OF LEFT SHIN INSIDE OF RIGHT SHIN | ROLL AXIS OF LEFT HIP ROLL AXIS OF RIGHT HIP | $m_{14}(Si)$ | $n_{14}(Si)$ | — | — | TABLE 2 |
| SPACE FORMED BY FRONT OF LEFT THIGH AND BODY | TACT SWITCH 7 | FRONT OF LEFT THIGH | PITCH AXIS OF LEFT HIP PITCH AXIS OF BODY | $m_{15}(Si)$ | $n_{15}(Si)$ | — | — | TABLE 2 |
| SPACE FORMED BY FRONT OF RIGHT THIGH AND BODY | TACT SWITCH 8 | FRONT OF RIGHT THIGH | PITCH AXIS OF RIGHT HIP PITCH AXIS OF BODY | $m_{16}(Si)$ | $n_{16}(Si)$ | — | — | TABLE 2 |
| SPACE FORMED BY LEFT FOREARM AND BODY | TACT SWITCH 9 | LEFT SIDE OF WAIST | ROLL AXIS OF LEFT SHOULDER PITCH AXIS OF BODY | $m_{17}(Si)$ | $n_{17}(Si)$ | — | — | TABLE 2 |
| SPACE FORMED BY RIGHT FOREARM AND BODY | TACT SWITCH 10 | RIGHT SIDE OF WAIST | ROLL AXIS OF RIGHT SHOULDER PITCH AXIS OF BODY | $m_{18}(Si)$ | $n_{18}(Si)$ | — | — | TABLE 2 |

FIG. 23

SURROUNDINGS

| SPACE | SENSOR | POSITION OF SENSOR | RELEVANT JOINT | THRE-SHOLD VALUE 1 | THRE-SHOLD VALUE 2 | THRE-SHOLD VALUE 3 | EMERGENCY PREVENTION AMOUNT | COUNTER-MEASURE TYPE |
|---|---|---|---|---|---|---|---|---|
| SPACE FORMED BY BODY AND SURROUNDING OBSTACLE | CCD | HEAD UNIT | — | $m_{19}(s_i)$ | $n_{19}(s_i)$ | $l_3(s_i)$ | $p_3$ | TABLE 3 |

SINGLE JOINT

| SPACE | THRESHOLD VALUE 1 | THRESHOLD VALUE 2 | THRESHOLD VALUE 3 | EMERGENCY PREVENTION AMOUNT |
|---|---|---|---|---|
| SPACE ON THE OUTSIDE OF LEFT HIP | 15 | 10 | – | – |
| SPACE ON THE OUTSIDE OF RIGHT HIP | 15 | 10 | – | – |
| SPACE AT THE BACK OF LEFT KNEE | 20 | 15 | 12 | 12 |
| SPACE AT THE BACK OF RIGHT KNEE | 20 | 15 | 12 | 12 |
| SPACE FORMED BY LEFT SHIN AND LEFT INSTEP | 25 | 20 | – | – |
| SPACE FORMED BY RIGHT SHIN AND RIGHT INSTEP | 25 | 20 | – | – |
| SPACE ON THE OUTSIDE OF LEFT ANKLE | 37 | 32 | – | – |
| SPACE ON THE OUTSIDE OF RIGHT ANKLE | 37 | 32 | – | – |
| SPACE UNDER LEFT ARMPIT | 35 | 25 | – | – |
| SPACE UNDER RIGHT ARMPIT | 35 | 25 | – | – |
| SPACE FORMED BY LEFT UPPER ARM AND LEFT FOREARM | 40 | 30 | – | – |
| SPACE FORMED BY RIGHT UPPER ARM AND RIGHT FOREARM | 40 | 30 | – | – |

FIG. 25A

PLURAL LINKS

| SPACE | THRESHOLD VALUE 1 | THRESHOLD VALUE 2 | THRESHOLD VALUE 3 | EMERGENCY PREVENTION AMOUNT |
|---|---|---|---|---|
| SPACE ON THE INSIDE OF LEG ABOVE KNEE | 50 | 30 | - | - |
| SPACE ON THE INSIDE OF LEG UNDER KNEE | 20 | 10 | - | - |
| SPACE FORMED BY FRONT OF LEFT THIGH AND BODY | 40 | 25 | - | - |
| SPACE FORMED BY FRONT OF RIGHT THIGH AND BODY | 40 | 25 | - | - |

FIG. 25B

SURROUNDINGS

| SPACE | THRESHOLD VALUE 1 | THRESHOLD VALUE 2 | THRESHOLD VALUE 3 | EMERGENCY PREVENTION AMOUNT |
|---|---|---|---|---|
| SPACE FORMED BY BODY AND SURROUNDING OBSTACLE | 70 | 20 | 10 | 10 |

FIG. 25C

| BODY CONDITIONS | IGNORANCE STAGE | WARNING STAGE | EMERGENT STAGE | EMERGENCY PREVENTION STAGE |
|---|---|---|---|---|
| STANDING (S1) | CONTINUE CURRENT ACTION | GRADUALLY STOP CURRENT ACTION CONSIDER BODY PROTECTION (SO AS TO RESUME ACTION EASILY) CAUSE WEAKNESS IN ALL JOINTS (SINGLE ARM UNIT) OF LINKS ATTACHED TO THE JOINT | IMMEDIATELY STOP WHOLE BODY DO NOT CONSIDER BODY PROTECTION CAUSE WEAKNESS IN ALL JOINTS (SINGLE ARM UNIT) OF LINKS ATTACHED TO THE JOINT | — |
| MOVING ON FLOOR (S2) | CONTINUE CURRENT ACTION | GRADUALLY STOP CURRENT ACTION CONSIDER BODY PROTECTION (SO AS TO RESUME ACTION EASILY) CAUSE WEAKNESS IN ALL JOINTS (SINGLE ARM UNIT) OF LINKS ATTACHED TO THE JOINT | IMMEDIATELY STOP WHOLE BODY DO NOT CONSIDER BODY PROTECTION CAUSE WEAKNESS IN ALL JOINTS (SINGLE ARM UNIT) OF LINKS ATTACHED TO THE JOINT | — |
| ON STATION (S3) | CONTINUE CURRENT ACTION | GRADUALLY STOP CURRENT ACTION CONSIDER BODY PROTECTION (SO AS TO RESUME ACTION EASILY) CAUSE WEAKNESS IN ALL JOINTS (SINGLE ARM UNIT) OF LINKS ATTACHED TO THE JOINT | IMMEDIATELY STOP WHOLE BODY DO NOT CONSIDER BODY PROTECTION CAUSE WEAKNESS IN ALL JOINTS (SINGLE ARM UNIT) OF LINKS ATTACHED TO THE JOINT | — |
| LIFTED (S4) | — | — | — | — |
| RECOVERING (S5) | CONTINUE RECOVERING ACTION | — | IMMEDIATE STOP | — |

| BODY CONDITIONS | IGNORANCE STAGE | WARNING STAGE | EMERGENT STAGE | EMERGENCY PREVENTION STAGE |
|---|---|---|---|---|
| STANDING (S1) | CONTINUE CURRENT ACTION | GRADUALLY STOP CURRENT ACTION CONSIDER BODY PROTECTION (SO AS TO RESUME ACTION EASILY) | IMMEDIATELY STOP WHOLE BODY DO NOT CONSIDER BODY PROTECTION | EXPAND SAFE SPACE IMMEDIATELY STOP WHOLE BODY DO NOT CONSIDER BODY PROTECTION CAUSE WEAKNESS IN ALL JOINTS (SINGLE ARM UNIT) OF LINKS ATTACHED TO THE JOINT |
| MOVING ON FLOOR (S2) | CONTINUE CURRENT ACTION | GRADUALLY STOP CURRENT ACTION CONSIDER BODY PROTECTION (SO AS TO RESUME ACTION EASILY) | IMMEDIATELY STOP WHOLE BODY DO NOT CONSIDER BODYPROTECTION CAUSE WEAKNESS IN ALL JOINTS (SINGLE ARM UNIT) OF LINKS ATTACKED TO THE JOINT | EXPAND SAFE SPACE IMMEDIATELY STOP WHOLE BODY DO NOT CONSIDER BODY PROTECTION CAUSE WEAKNESS IN ALL JOINTS (SINGLE ARM UNIT) OF LINKS ATTACHED TO THE JOINT |
| ON STATION (S3) | CONTINUE CURRENT ACTION | — | — | — |
| LIFTED (S4) | — | — | — | — |
| RECOVERING (S5) | CONTINUE RECOVERING ACTION | IMMEDIATE STOP | IMMEDIATE STOP | — |

| BODY CONDITIONS | IGNORANCE STAGE | WARNING STAGE | EMERGENT STAGE | EMERGENCY PREVENTION STAGE |
|---|---|---|---|---|
| STANDING (S1) | CONTINUE CURRENT ACTION | GRADUALLY STOP CURRENT ACTION CONSIDER BODY PROTECTION (SO AS TO RESUME ACTION EASILY) | IMMEDIATELY STOP WHOLE BODY DO NOT CONSIDER BODY PROTECTION | EXPAND SAFE SPACE → FALL IS SELECTABLE IMMEDIATELY STOP WHOLE BODY DO NOT CONSIDER BODY PROTECTIONZ |
| MOVING ON FLOOR (S2) | CONTINUE CURRENT ACTION | GRADUALLY STOP CURRENT ACTION CONSIDER BODY PROTECTION (SO AS TO RESUME ACTION EASILY) | IMMEDIATELY STOP WHOLE BODY DO NOT CONSIDER BODY PROTECTION | EXPAND SAFE SPACE → FALL IS SELECTABLE IMMEDIATELY STOP WHOLE BODY DO NOT CONSIDER BODY PROTECTIONZ |
| ON STATION (S3) | CONTINUE CURRENT ACTION | GRADUALLY STOP CURRENT ACTION CONSIDER BODY PROTECTION (SO AS TO RESUME ACTION EASILY) | IMMEDIATELY STOP WHOLE BODY DO NOT CONSIDER BODY PROTECTION | EXPAND SAFE SPACE IMMEDIATELY STOP WHOLE BODY DO NOT CONSIDER BODY PROTECTION |
| LIFTED (S4) | — | — | — | — |
| RECOVERING (S5) | CONTINUE RECOVERING ACTION | — | IMMEDIATE STOP | — |

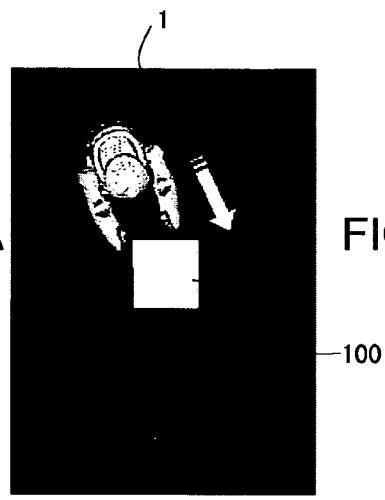
FIG. 36A
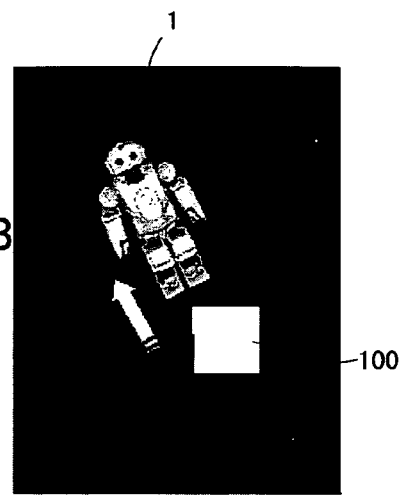
FIG. 36B
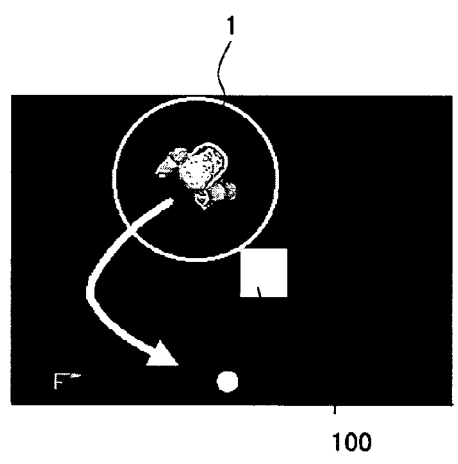
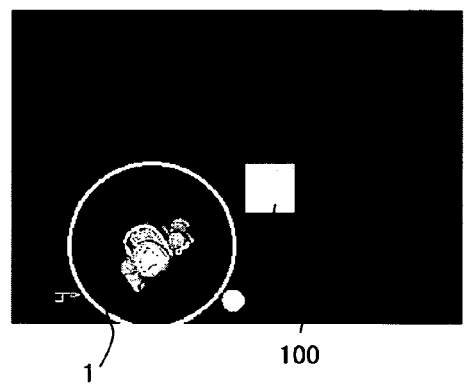
FIG. 37A  FIG. 37B

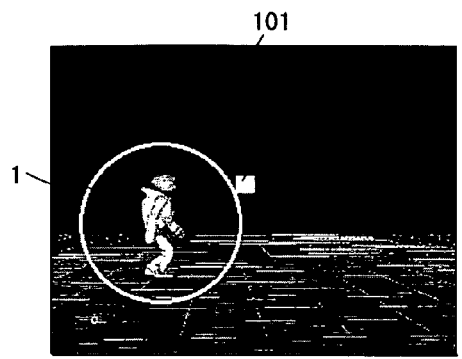 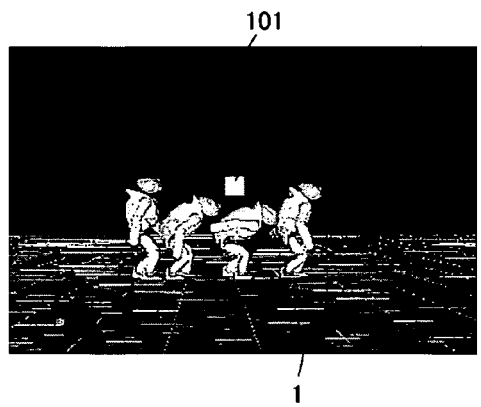
FIG. 38A  FIG. 38B
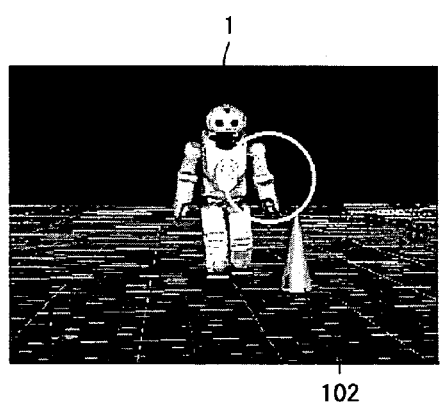 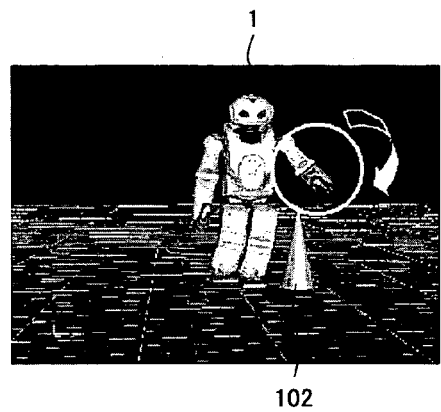
FIG. 39A  FIG. 39B

ROBOT APPARATUS AND CONTROL METHOD THEREOF

BACKGROUND OF THE INVENTION

1. Field of the Invention

This invention relates to a robot apparatus and a control method thereof, and more particularly, is suitably applicable to a humanoid robot.

2. Description of the Related Art

Most industrial robots are stationary robots. Therefore, to protect users, the industrial robots employ such safeguards that sensors for detecting dangers around the robots are provided, defensive walls are built or do-not-enter zones are set around the robots.

In addition, the industrial robots are generally installed with stability. When a safety level status in danger is detected, we just stop the robots immediately as countermeasures against this status, without considering the protection of the robots.

In a case of humanoid entertainment robots which autonomously move and behave, however, the robots moves according to their own decisions. Therefore, the above safeguards can not be used.

In addition, if we stop such entertainment robots suddenly when a safety level status in danger is detected, the robots will be off balance and fall down. As a result, some parts of the robots may be broken. Therefore, we should consider safeguards for not only users but also the robots.

In view of the properties of the entertainment robots, what we should consider is that countermeasures against dangers should be taken so that the robots can resume their actions such as moving or dancing immediately, that is, so that the working efficiency of the robots can be set to the maximum in normal conditions.

SUMMARY OF THE INVENTION

In view of the foregoing, an object of this invention is to provide a robot apparatus and a control method thereof which are capable of offering improved safety.

The foregoing objects and other objects of the invention have been achieved by the provision of a movable robot apparatus. This robot apparatus comprises: a safety level status detecting unit for detecting a safety level status; a safety level detecting unit for detecting the safety level of the safety level status detected by the safety level status detecting unit; and a control unit for performing a control process to implement prescribed countermeasures according to the safety level status detected by the safety level status detecting unit and the safety level detected by the safety level detecting unit.

As a result, the robot apparatus can implement appropriate countermeasures against a safety level status when or before the safety level status in danger is detected.

Further, the foregoing objects and other objects of the invention have been achieved by the provision of a control method of a movable robot apparatus. This control method comprises a first step of detecting a safety level status and the safety level of the detected safety level status, and a second step of performing a control process to make the robot apparatus implement prescribed countermeasures according to the detected safety level status and the detected safety level.

As a result, with the control method of the robot apparatus, appropriate countermeasures can be implemented against a safety level status when or before the safety level status in danger is detected.

Still further, a movable robot apparatus of this invention comprises a safety level status detecting unit for detecting a safety level status and a control unit for performing a control process to implement prescribed countermeasures according to the position of the safety level status detected by the safety level status detecting unit.

As a result, the robot apparatus can take appropriate countermeasures according to the position of a safety level status.

Still further, a control method of a movable robot apparatus of this invention comprises a first step of detecting a safety level status and a second step of performing a control process to make the robot apparatus implement prescribed countermeasures according to the position of the safety level status detected in the first step.

As a result, with this control method, the robot apparatus can implement appropriate countermeasures according to the position of a safety level status.

Still further, according to this invention, a robot apparatus having a plurality of movable units comprises: a driving unit for driving the movable units; a control unit for controlling the driving unit; an object detecting unit for detecting an object; an action determination unit for determining an action of the robot apparatus; and a safety level detecting unit for detecting the safety level involving the object and the movable units. The control unit moves the movable units based on the safety level and the action determined by the action determination unit in order to mitigate or avoid the danger.

As a result, the robot apparatus can surely mitigate or avoid danger.

Still further, according to this invention, a control method of a robot apparatus having a plurality of movable units comprises: a first step of determining an action of the robot apparatus; a second step of, when an object is detected, detecting the safety level involving the object and the movable units; and a third step of moving the movable units according to the detected safety level and the determined action in order to mitigate or avoid the danger.

As a result, with this control method, the robot apparatus can surely mitigate or avoid danger.

According to this invention, in a movable robot apparatus and a control method thereof, a safety level status is detected and the safety level of the detected safety level status is also detected, and a control process is performed so as to make the robot apparatus implement prescribed countermeasures according to the detected safety level status and the safety level of the safety level status. As a result, the robot apparatus can implement appropriate countermeasures against a safety level status when or before the safety level status in danger is detected, thus making it possible to realize a robot apparatus and a control method thereof, which are capable of offering improved safety.

Further, according to this invention, in a movable robot apparatus and a control method thereof, a safety level status detecting unit for detecting a safety level status and a control unit for performing a control process to make the robot apparatus implement prescribed countermeasures according to the position of the safety level status detected by the safety level status detecting unit are provided. As a result, the robot apparatus can implement appropriate countermeasures according to the position of a safety level status, thus making it possible to realize a robot apparatus and a control method thereof, which are capable of offering improved safety.

Still further, according to this invention, in a robot apparatus having a plurality of movable units and a control method thereof, an action of the robot apparatus is determined, the safety level involving an object and the movable units is detected when the object is detected, and the movable units are moved according to the detected safety level and the determined action, thereby mitigating or avoiding the danger. Thus a robot apparatus and a control method thereof can be realized, which are capable of offering improved safety.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 22 shows a first safe space management table;

FIG. 23 shows a second safe space management table;

FIG. 24 shows a third safe space management table;

FIGS. 25A to 25C show an example of parameter values in the first to third safe space management tables;

FIG. 27 shows a first countermeasure table;

FIG. 28 shows a second countermeasure table;

FIG. 29 shows a third countermeasure table;

FIGS. 36A and 36B are conceptual views showing an example of emergency prevention performance;

FIGS. 37A and 37B, 38A and 38B, and 39A and 39B are conceptual views showing examples of preventative actions;

DETAILED DESCRIPTION OF THE EMBODIMENT

Preferred embodiments of this invention will be described with reference to the accompanying drawings:

(1) Entire Structure of a Robot 1 According to this Embodiment

Figure 1:
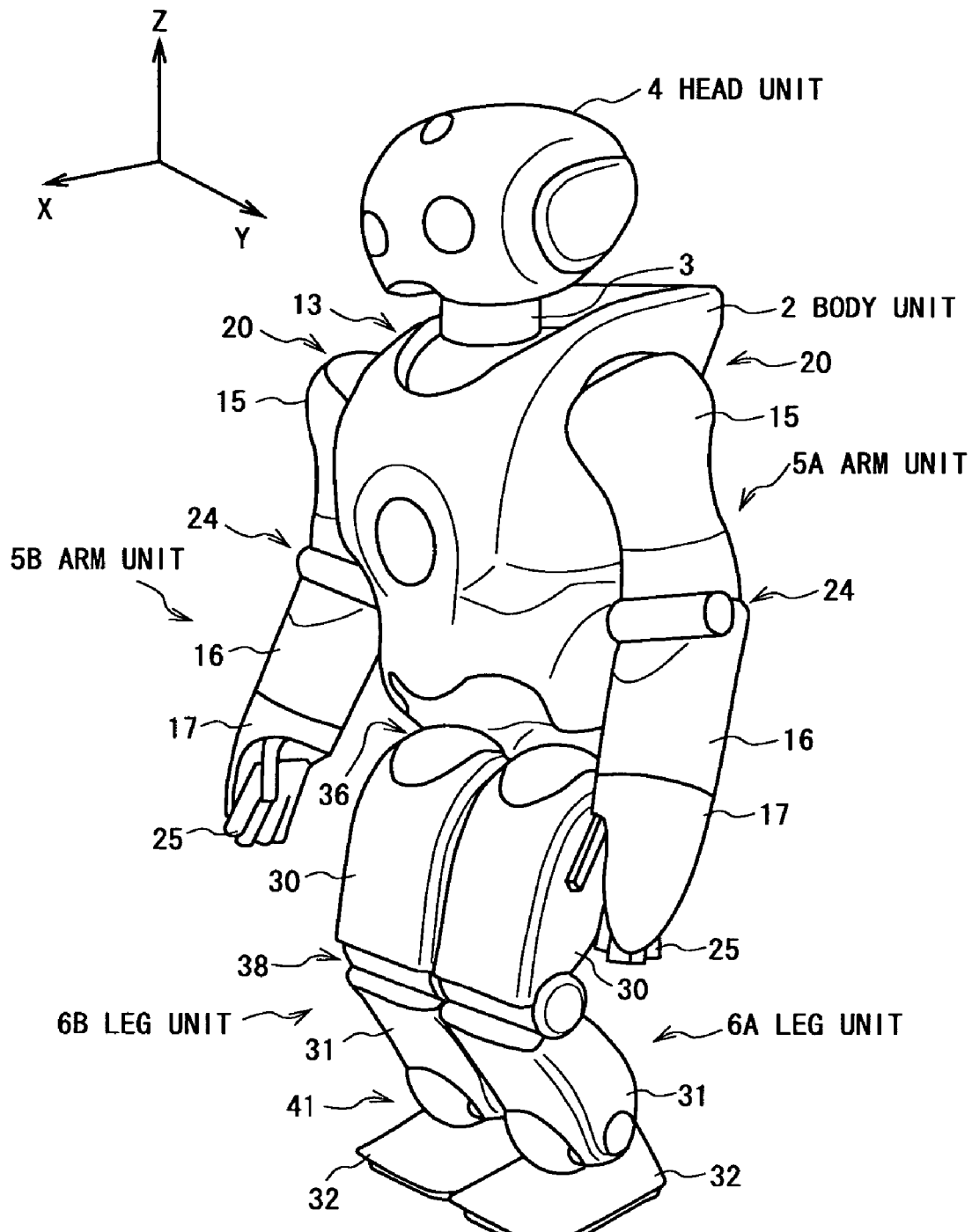
FIGS. 1 and 2 schematically show perspective views showing an external structure of a robot apparatus according to the present invention.
Figure 2:
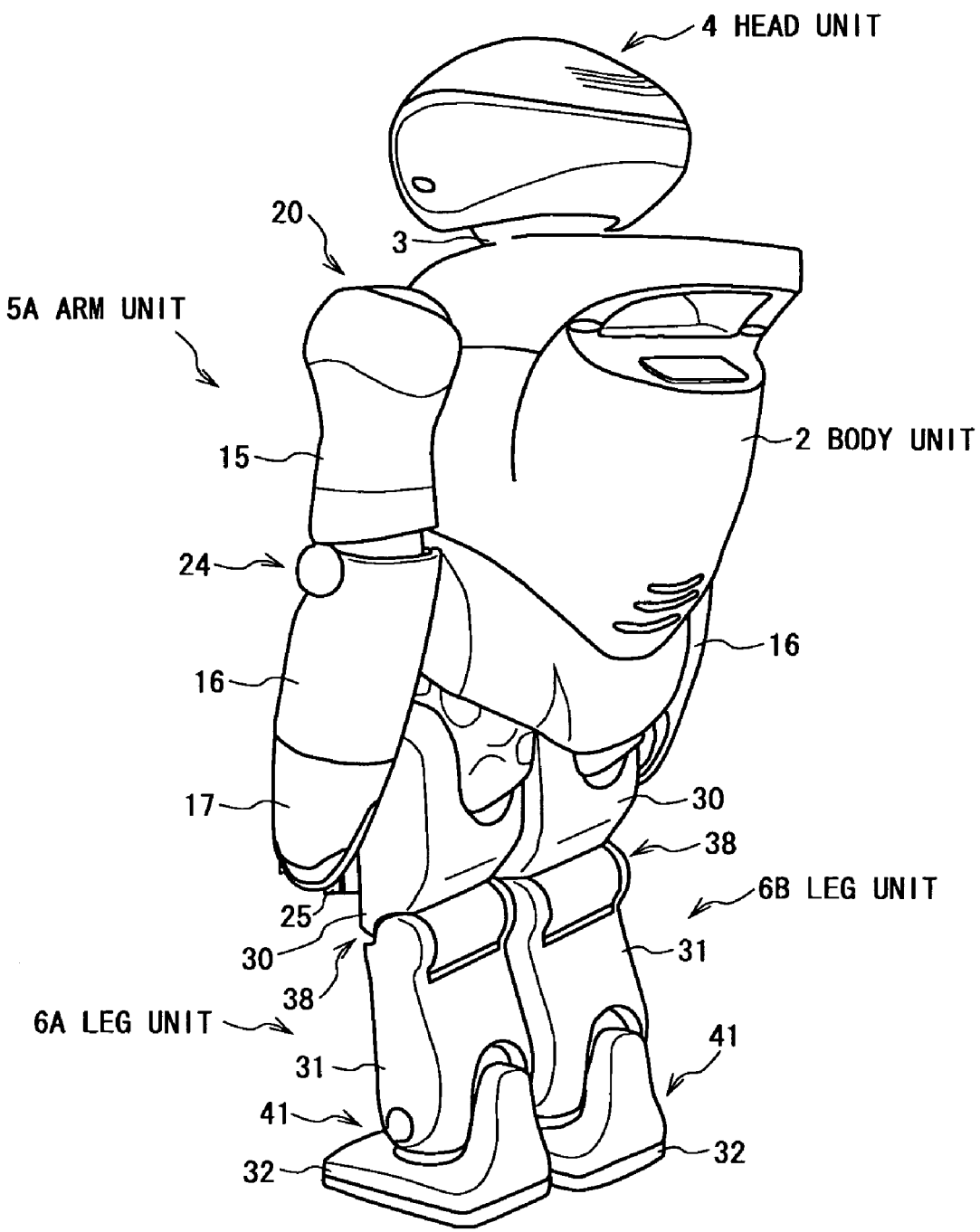

In FIGS. 1 and 2, reference numeral 1 shows a robot of this embodiment as a whole. As shown in these figures, this robot is composed of a body unit 2, a neck unit 3, a head unit 4, arm units 5A and 5B, and leg units 6A and 6B.

Figure 3:
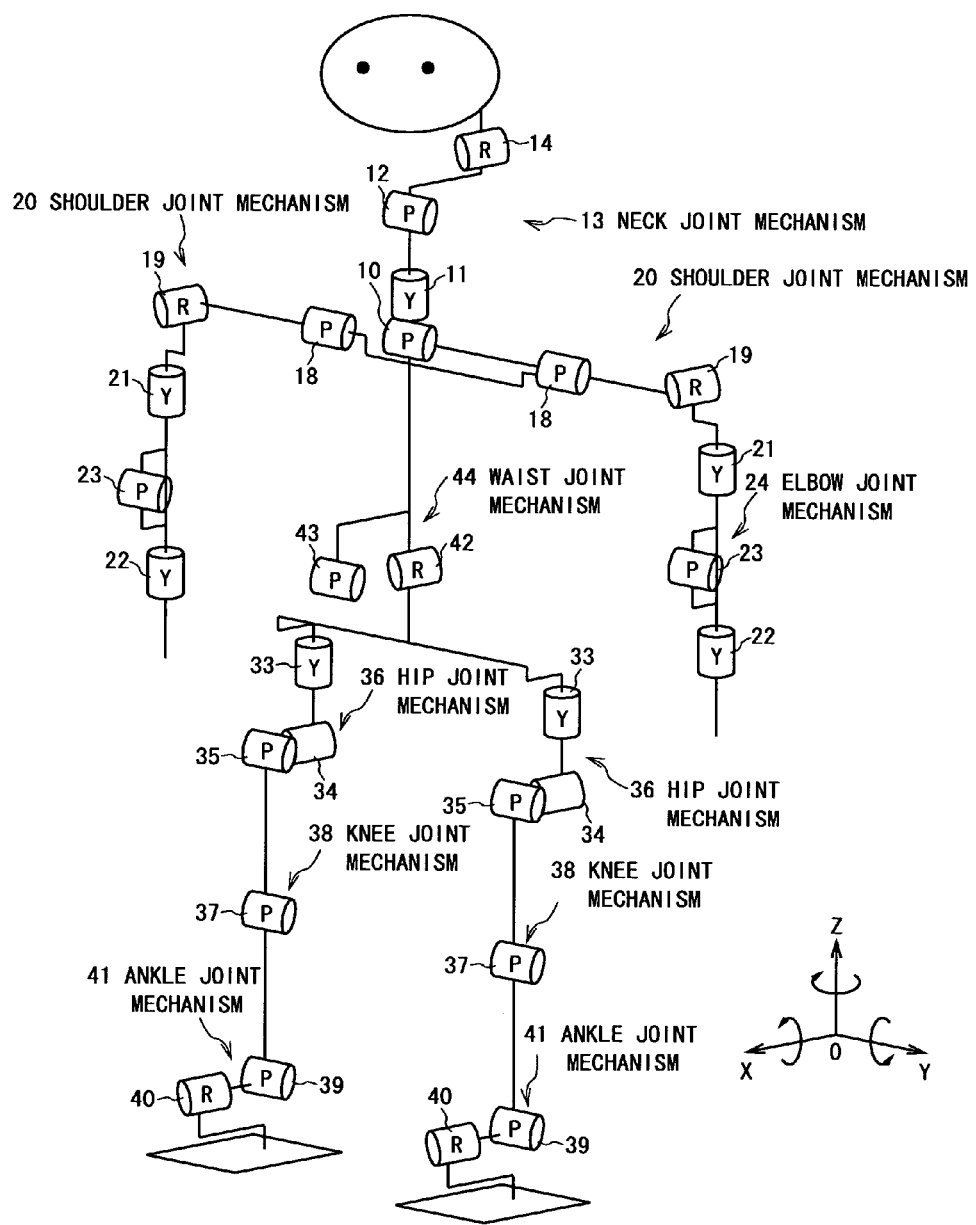
FIG. 3 shows the concept of a degree of freedom in each joint mechanism unit of the robot.

Referring to FIG. 3, the neck unit 3 is supported by a neck joint mechanism 13 having a degree of freedom around a neck pitch axis 10, a neck yaw axis 11 and a neck pitch axis 12. In addition, the head unit 4 is attached to the neck unit 3 with a degree of freedom around a neck roll axis 14. Thereby the robot 1 can turn the head unit 4 in a desired direction such as front, back, right, left, or diagonally.

As seen from FIGS. 1 and 2, each arm unit 5A, 5B is composed of three block, i.e., an upper arm block 15, a forearm block 16, and a hand block 17. The arm block 15 is attached to the body unit 2 via a shoulder joint mechanism 20 having a degree of freedom around a shoulder pitch axis 18 and a shoulder roll axis 19 as shown in FIG. 3.

The forearm block 16 is attached to the upper arm block 15, with a degree of freedom around an upper arm yaw axis 21 as shown in FIG. 3. The hand unit 17 is attached to the forearm block 16, with a degree of freedom around a wrist yaw axis 22 as shown in FIG. 3. The forearm block 16 is provided with an elbow joint mechanism 24 having a degree of freedom around an elbow pitch axis 23.

Thereby the robot 1 can move the arm units 5A and 5B with a degree of freedom which is almost the same as that of the arms of human beings. For example, the robot 1 is able to take various actions by using the arm units 5A and 5B, such as greeting by raising one hand up or dancing with swinging the arms 5A and 5B around.

Further, five bendable and stretchable fingers 25 are attached to the hand block 17. As a result, the robot 1 can grasp and hold objects with these fingers.

As seen from FIGS. 1 and 2, each leg 6A, 6B, on the other hand, is composed of three blocks, i.e., a thigh block 30, a shin block 31, and a foot block 32. The thigh block 30 is attached to the body unit 2 via a hip joint mechanism 36 having a degree of freedom around a hip yaw axis 33, a hip roll axis 34, and a hip pitch axis 35 as shown in FIG. 3.

The thigh block 30 and the shin block 31 are connected to each other via a knee joint mechanism 38 having a degree of freedom around a knee pitch axis 37 as shown in FIG. 3. The shin block 31 and the foot block 32 are connected to each other via an ankle joint mechanism 41 having a degree of freedom around an ankle pitch axis 39 and an ankle roll axis 40.

As a result, the robot 1 can move the leg units 6A and 6B with a degree of freedom which is almost the same as that of the legs of human beings. Thus the robot 1 can take various actions with the leg units 6A and 6B such as walking and kicking a boll.

In addition, each hip joint mechanism 36 of this robot 1 is supported by a waist joint mechanism 44 having a degree of freedom around a body roll axis 42 and a body pitch axis 43 as shown in FIG. 3. As a result, the robot 2 can lean the body unit 2 front, back, left and right as desired.

As driving sources for moving the head unit 4, the arm units 5A and 5B, the leg units 6A and 6B and the body unit 2 as described above, the robot 1 is provided with actuators $A_1$ to $A_{17}$ each having an appropriate degree of freedom, at the units each having a degree of freedom, including joint mechanisms such as the neck joint mechanism 13 and the shoulder joint mechanism 20. These actuators $A_1$ to $A_{17}$ are made by containing an IC-tip operation circuit and current detector for detecting a value of driving current in a case, and have a function to communicate with external devices (for example, refer to Japanese Patent Laid Open No. 2000-38097).

Figure 5:
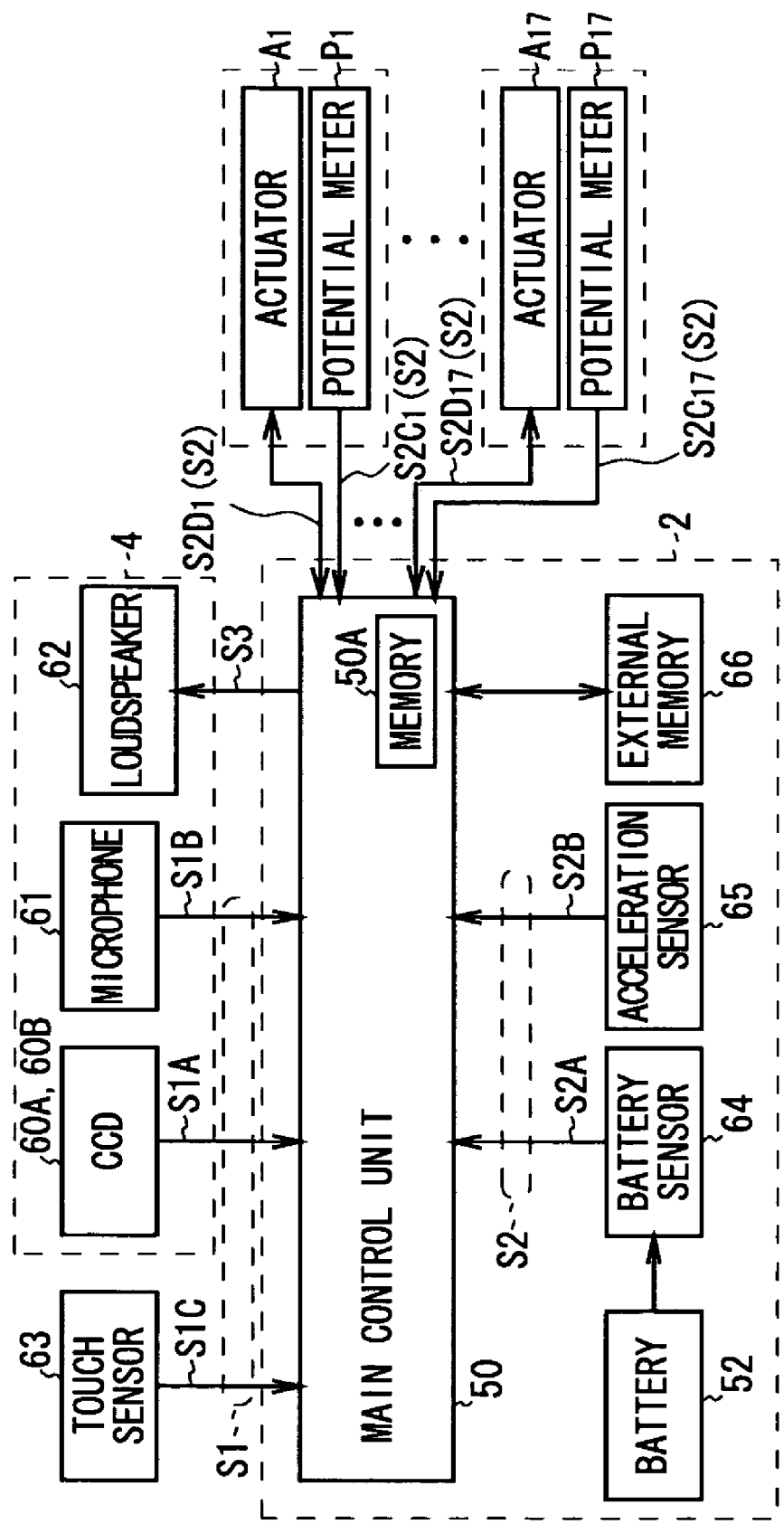

The body unit 2 contains a main control unit 50 for controlling the entire operation of the robot apparatus 1, peripheral circuitry 51 including a power circuit and a communication circuit and a battery 52 (FIG. 5). Each constituent unit (body unit 2, head unit 4, arm units 5A and 5B, and leg units 6A and 6B) contains sub-control units 53A to 53D which are linked to the main control unit 50.

Furthermore, as shown in FIG. 5, at predetermined positions on the head unit 4 arranged are various external sensors such as a charge coupled device (CCD) cameras 60A and 60B functioning as the "eyes" of the robot 1, a microphone 61 as the "ears", and a loudspeaker 62 as the "mouth". In addition, as the external sensors, touch sensors 63 are arranged at predetermined positions including the soles of the foot units 32 of the leg units 6A and 6B.

Inside the body unit 2, on the other hand, arranged are various internal sensors including a battery sensor 64 and an acceleration sensor 65. In addition, as the internal sensors, inside the constituent units arranged are potential meters $P_1$ to $P_{17}$ for detecting the rotation angles of the output shafts of the corresponding actuators $A_1$ to $A_{17}$, the potential meters $P_1$ to $P_{17}$ in correspondence with the actuator $A_1$ to $A_{17}$.

The CCD cameras 60A and 60B capture the surroundings and send captured video signals S1A to the main control unit 50 via the sub-control unit 53B (not shown in FIG. 5). The microphone 61 collects external sounds and sends an obtained audio signal S1B to the main control unit 50 via the sub-control unit 53B.

In addition, each touch sensor 63 detects physical pressures from a user and physical contacts with the outside, and sends the detected result to the main control unit 50 as a pressure signal S1C via the corresponding sub-control unit 53A to 53D (not shown in FIG. 5).

Furthermore, the battery sensor 64 periodically detects an energy level of the battery 52, and sends the detected result to the main control unit 50 as a battery level signal S2A. The acceleration sensor 65 periodically detects acceleration in three axes (x-axis, y-axis, and z-axis), and sends the detected results to the main control unit 50 as an acceleration signal S2B.

Further, the potential meters $P_1$ to $P_{17}$ detect the rotation angles of the output shafts of the corresponding actuators $A_1$ to $A_{17}$, and periodically send the detected results to the main control unit 50 via the corresponding sub-control units 53A to 53D as angle signals $S2C_1$ to $S2C_{17}$. Each actuator $A_1$ to $A_{17}$ calculates own output torque based on the value of driving current detected by the above-described current detector provided inside, and sends the calculated result to the main control unit 50 via the corresponding sub-control unit 53A to 53D as an output torque signal $S2D_1$ to $S2D_{17}$.

The main control unit 50 detects external and internal states of the robot 1, physical contacts with a user, etc. based on external sensor signals S1 and internal sensor signals S2. The external sensor signals S1 include the video signals S1A, the audio signal S1B, the pressure signal S1C, etc., given from the external sensors such as the CCD cameras 60A and 60B, microphone 61 and touch sensors 63. The internal sensor signals include the battery level signal S2A, the acceleration signal S2B, and angle signals $S2C_1$ to $S2C_{17}$ given from the internal sensors such as the battery sensor 64, the acceleration sensor 65 and the potential meters $P_1$ to $P_{17}$.

Figure 4:
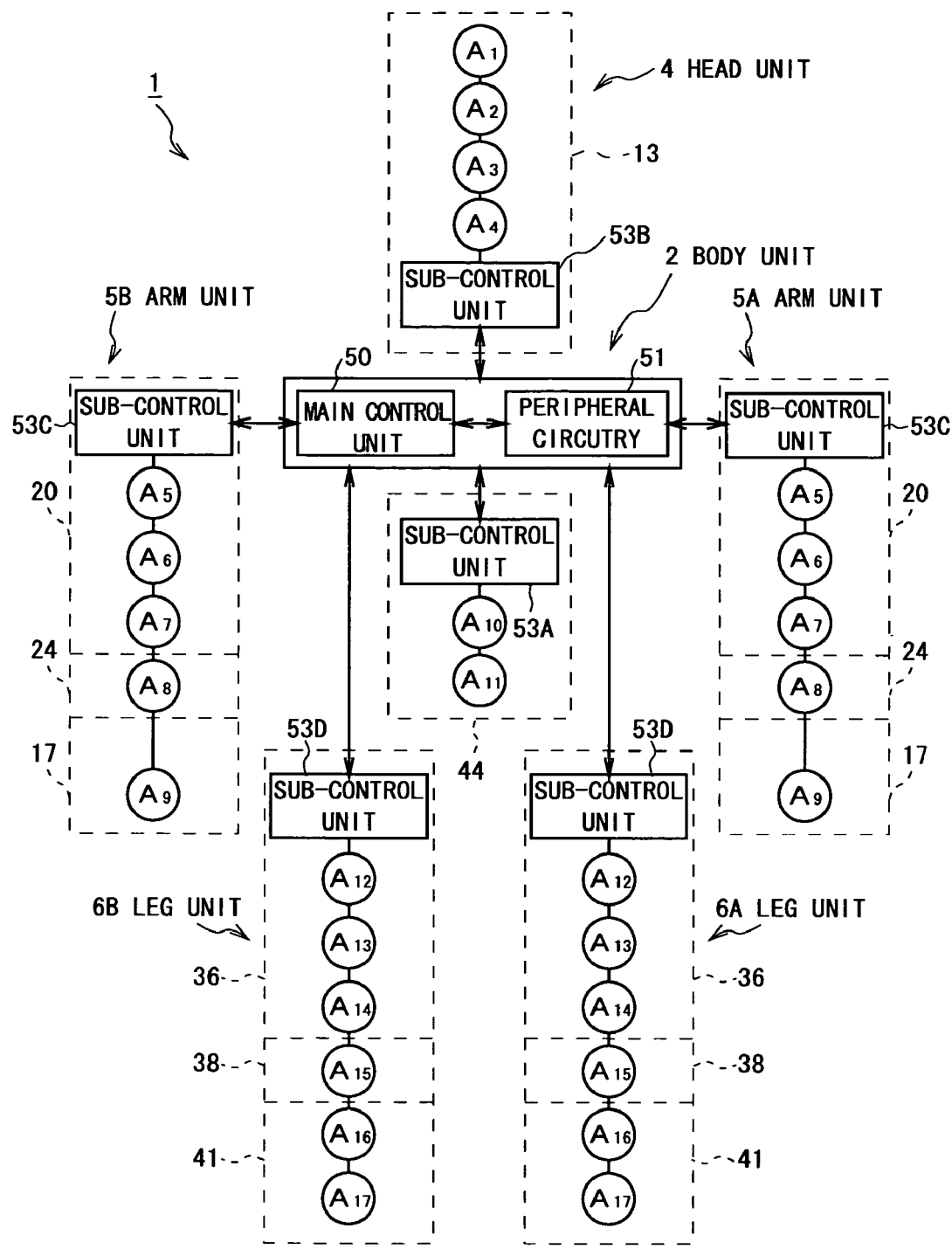
FIGS. 4 and 5 are block diagrams showing an internal structure of the robot.

Then the main control unit 50 determines a subsequent robot action based on the detected results, a control program being stored in an internal memory 50A, and various control parameters being stored in an external memory 66 being installed, and sends control commands based on the determined result to relevant sub-control units 53A-53D (FIG. 4).

As a result, the specified actuators $A_1$-$A_{17}$ are set in motion based on the control commands and under the control of the sub-control units 53A-53D, thus letting the robot 1 take the action, such as moving the head unit 4 up and down, left to right, raising the arm units 5A, 5B, or walking.

As described above, the robot 1 is capable of behaving autonomously based on external and internal states.

(2) Processing Contents of the Main Control Unit 50 for Creation of Action.

The processing contents of the main control unit 50 for creation of an action will be now described.

Figure 6:
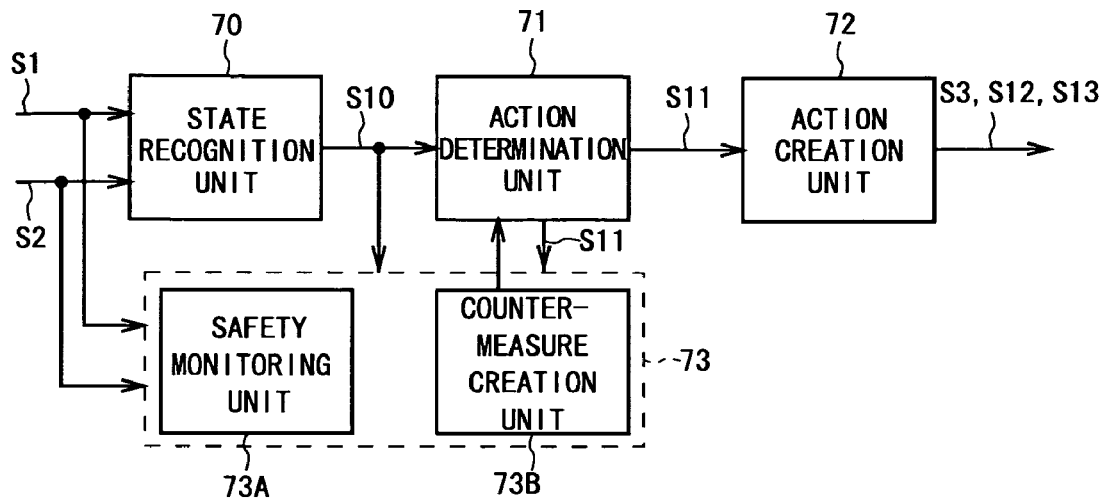
FIG. 6 is a block diagram explaining processing contents of a main control unit for action creation.

The processing contents of the main control unit 50 for creation of robot actions are functionally divided into a state recognition unit 70, an action determination unit 71, an action creation unit 72 as shown in FIG. 6. The state recognition unit 70 recognizes the external and internal states based on the external and internal sensors' outputs. The action determination unit determines a next action of the robot 1 based on the recognition results of the state recognition unit 70. The action creation unit 72 makes the robot 1 take the action selected and determined by the action determination unit 71.

Specifically, the state recognition unit 70 recognizes the current states based on the external sensor signals S1 given from the various external sensors and the internal sensor signals S2 given from the various internal sensors, and notifies the action determination unit 71 of the recognized results as a state signal S10.

In actual, the state recognition unit 70 performs various image processes including a process to recognize and identify a human face existing within the capture area of the CCD cameras 60A and 60B based on the video signals S1A given from the CCD cameras 60A and 60B and a process to detect an obstacle and calculate a distance to the obstacle by means of a stereo measurement method, and notifies the action determination unit 71 of these recognized results.

Further, the state recognition unit 70 always monitors the audio signal S1B given from the microphone 61 (FIG. 5), recognizes various input sounds based on the audio signal S1B and also recognizes user conversation word by word, which are included in the audio signal S1B, and notifies the action determination unit 71 of these recognized results.

Furthermore, the state recognition unit 70 recognizes physical contacts from a user or physical contact with a user or an other external object, based on the pressure signals S1C given from the touch sensors 63 (FIG. 5), and notifies the action determination unit 71 of these recognized results.

Furthermore, the state recognition unit 70 recognizes the energy level of the battery 52 and the posture of the robot 1 based on the internal sensor signals S2 such as the energy level signal S2A given from the battery sensor 64 (FIG. 5), the acceleration signal S2B given from the acceleration sensor 65 (FIG. 5), and the angle signals $S2C_1$ to $S2C_{17}$ given from the potential meters $P_1$ to $P_{17}$, and notifies the action determination unit 71 of these recognized results.

The action determination unit 71 is equipped with a state-based action determination module for determining a next action of the robot 1 according to the external and internal states and a reflex action determination module for determining a reflex action of the robot 1 as a next action according to the external or internal state. The action determination unit 71 notifies the action creation unit 72 of as an action signal S11 a next action which is determined by the state-based action determination module or the reflex action determination module based on the state signal S10 given from the state recognition unit 70.

The action creation unit 72 sends a driving signal S12 to relevant actuators $A_1$ to $A_{17}$ via the sub-control units 53A to 53D (FIG. 4) based on the action signal S11 given from the action determination unit 71, sends an audio signal S3 to the loudspeaker 62, and sends a light emitting diode (LED) driving signal S13 to the LED (not shown) arranged at "eye" positions on the head unit 4.

Thereby, the action creation unit 72 drives the relevant actuators $A_1$ to $A_{17}$ in a prescribed state based on the driving signal S12, outputs sounds from the loudspeaker 62 based on the audio signal S3, and blinks the LED in a blinking pattern based on the LED driving signal S13.

As described above, the main control unit 50 is able to make the robot 1 take prescribed actions.

(3) Safeguards of the Robot 1

(3-1) Safety Monitoring by Safety Management Unit 73

Next, the safeguards of the robot 1 to protect people, objects, and the robot body will be described.

This robot 1 is provided with the touch sensors 63 (FIG. 5) at many positions including positions close to joint mechanisms (neck joint mechanism 13, shoulder joint mechanisms 20, elbow joint mechanisms 24, hip joint mechanisms 36, knee joint mechanisms 38 and ankle joint mechanisms 41) to detect insertion of a user's finger or contact with an external object. In addition, in the robot 1, the state recognition unit 70 always performs processes to detect an obstacle and calculate a distance to the obstacle by means of the stereo measurement method, based on the video signals S1A given from the CCD cameras 60A and 60B as described above.

When any touch sensor 63 detects insertion of a user's finger or when any touch sensor 63 or the image recognition process detects a contact or its sign with an external object, the robot 1 is designed to be able to take such the most appropriate countermeasures against the status as to resume the action which the robot 1 has been taking, as soon as possible, according to the posture of the robot 1, and the insertion state or the distance to the obstacle under the control of the safety management unit 73 (FIG. 6).

In actual, this robot 1 is provided with surface contact switches $63F_1$ to $63F_5$ as the safeguard touch sensors 63 on the armpits and the inside of the elbows of the arm units 5A and 5B, on the inside of the thigh blocks 30 and shin blocks 31 of the leg units 6A and 6B, and on the lower ends of the back of the thigh blocks 30 of the leg units 6A and 6B.

In addition, the robot 1 is provided with tact switches $63T_1$ to $63T_6$ as the safeguard touch sensors 63 on the right and left sides of the waist of the body unit 2, on the upper ends of the outside of the thigh blocks 30 of the leg units 6A and 6B, on the front sides of the thigh blocks 30 and shin blocks 31 of the leg units 6A and 6B, and on the soles and insteps of the foot blocks 32 of the leg units 6A and 6B.

In the robot 1, the safety management unit 73 is supplied with the external sensor signals S1 and internal sensor signals S2 output from the various external sensors and internal sensors including these surface contact switches $63F_1$ to $63F_5$ and tact switches $63T_1$ to $63T_6$ and the state signal S10 which indicates recognition results of the state recognition unit 70 including the existence or absence of an obstacle and a distance to the obstacle.

The safety management unit 73 is composed of a safety monitoring unit 73A and a countermeasure creation unit 73B. The safety monitoring unit 73A checks the received various external sensor signals S1, internal sensor signals S2 and state signal S10 with a procedure RT1 for safety monitoring shown in FIG. 10 to see whether a danger has occurred, for example, whether the robot 1 or an external object has been broken by contacting with or running into each other or whether there arises a possibility that the robot 1 is blocked by an obstacle.

That is, when the robot is powered ON, the safety monitoring unit 73A starts this safety monitoring procedure RT1 from step SP0. In next step SP1, the safety monitoring unit 73A waits any touch sensor 63 to operate (detect pressure) or an obstacle to be detected through the image recognition process, based on the pressure signals S1C given from the touch sensors 63 (surface contact switches $63F_1$ to $63F_5$ and tact switches $63T_1$ to $63T_6$) and the state signal S10 given from the state recognition unit 70.

When an affirmative result is obtained in this step SP1 since any touch sensor 63 has operated or an obstacle has been detected, the process goes on to step SP2 where the safety monitoring unit 73A determines whether the robot 1 needs to take countermeasures, based on the current posture, states, and movement of the robot 1 (hereinafter, referred to as body conditions) and the position of the operating touch sensor 63.

When a negative result is obtained in step S2, the process returns back to step SP1. When an affirmative result is obtained, on the contrary, the process goes on to step SP3 where the safety monitoring unit 73A determines whether the robot 1 is now taking some countermeasures.

When a negative result is obtained in step SP3, the process proceeds to step SP4 where the safety monitoring unit 73A sends to the countermeasure creation unit 73B a command instructing to take countermeasures (countermeasure implementation command). Then the process returns back to step S1 and the same processes are repeated hereafter.

When a positive result is obtained in step SP3, on the other hand, the process goes to step SP5 where the safety monitoring unit 73A sends to the countermeasure creation unit 73B a command instructing to change countermeasures (hereinafter, referred to as countermeasure changing command). Then the process returns back to step SP1 and the above processes are repeated hereafter.

Figure 11:
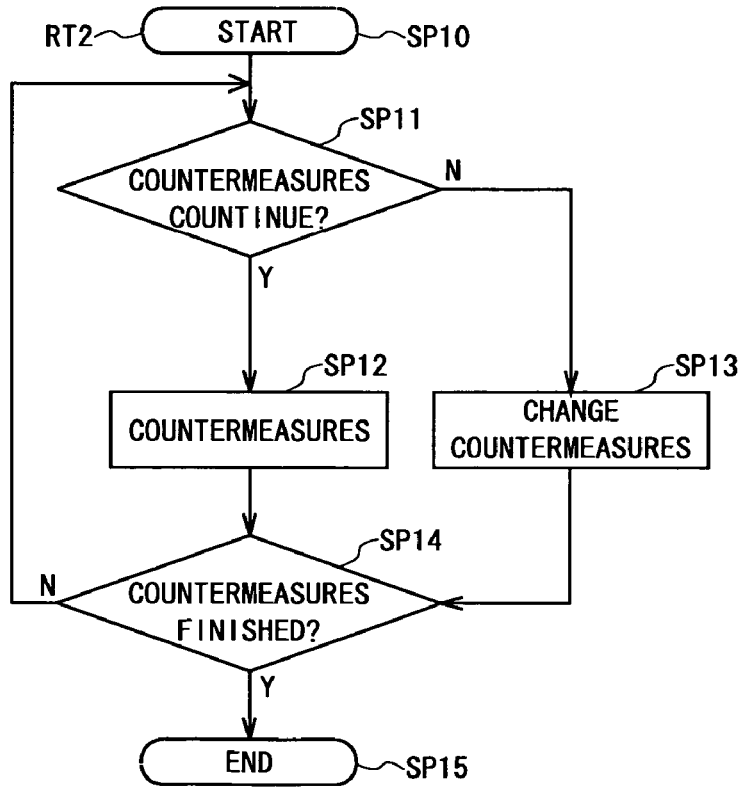
FIG. 11 is a flowchart showing a procedure for countermeasure creation.

Upon reception of the countermeasure implementation command from the safety monitoring unit 73A, the countermeasure creation unit 73B starts a procedure RT2 for countermeasure creation shown in FIG. 11 from step SP10. In next step SP11, the countermeasure creation unit 73B determines whether to continue the current countermeasures if the robot 2 is taking the countermeasures.

Specifically, this determination is made based on the safety level and position of the new safety level status to see which safety level status the robot 1 should deal with, the safety level status the robot 1 is now dealing with or the new safety level status.

When an affirmative result is obtained in step S11, the process proceeds to step SP12 where the countermeasure creation unit 73B selects countermeasures to be taken by the robot 1, based on the safety level of the safety level status, the position of the operating touch sensor 63, and the current body conditions of the robot 1, and sends to the action determination unit 71 a command instructing to take the countermeasures (hereinafter, referred to as a countermeasure creation command).

Upon reception of the countermeasure creation command from the countermeasure creation unit 73B, the action determination unit 71 regards this countermeasures as an action that the robot 1 should take immediately, and sends an action signal S11 according to this result to the action creation unit 72. Thereby the robot 1 takes the countermeasures immediately.

In a case where the robot has already started countermeasures, the countermeasure creation unit 73B does not send the countermeasure creation command to the action determination unit 71 in step S12. Therefore, the robot 1 continues the countermeasures.

Then the process proceeds to step SP14 where the countermeasure creation unit 73B determines whether to stop the countermeasures against the safety level status. When a negative result is obtained, the process returns back to step SP11.

When a positive result is obtained in step SP11 because countermeasures should be taken against the new safety level status immediately, the process proceeds to step SP13 where the countermeasure creation unit 73B selects new countermeasures to be taken by the robot 1 against the new safety level status, based on the safety level of the safety level status, the position of the operating touch sensor 63, and the current body conditions of the robot 1.

Then the countermeasure creation unit 73B sends to the action determination unit 71 a command (hereinafter, referred to as a countermeasure changing command) instructing to change countermeasures from the countermeasures which the robot 1 is now taking to the newly selected countermeasures.

Thus, in response to the countermeasure changing command, the action determination unit 71 regards the newly selected countermeasures as the next action of the robot 1, and sends an action signal S11 according to this result to the action creation unit 72. Thereby the robot 1 takes this newly selected countermeasures immediately.

In this embodiment, when the action determination unit 71 receives a countermeasure changing command, it controls relevant actuators $A_1$ to $A_{17}$ via the action creation unit 72 so that the robot 1 can take new countermeasures while omitting part of the countermeasures which are the same as those that the robot 1 has been taking. Thus the robot 1 can take the countermeasures immediately.

Then the process proceeds to step SP14 where the countermeasure creation unit 73B determines whether to stop the countermeasures against the safety level status. When a negative result is obtained, the process returns back to step SP11.

Then the countermeasure creation unit 73B repeats the steps SP11 to SP14 until a positive result is obtained in step SP14. When a positive result is obtained in step SP14, the process proceeds to step SP15 where the countermeasure creation unit 73B terminates this countermeasure creation procedure RT2.

As described above, the safety management unit 73 is able to monitor the existence or absence of a safety level status and perform a control process to make the robot 1 take appropriate countermeasures in parallel. Thereby the robot 1 is able to appropriately deal with a case where a safety level status is newly in danger with a higher priority while the robot 1 is taking countermeasures.

Figure 12:
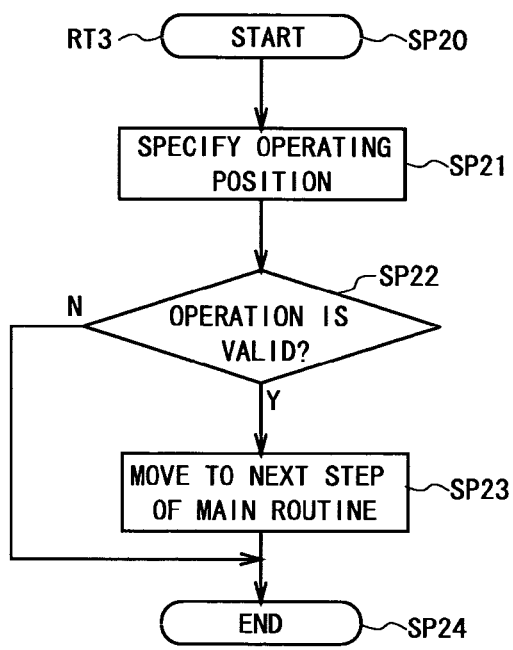
FIG. 12 is a flowchart showing a procedure for validly confirmation.

(3-2) Specific Processing of Safety Monitoring Unit 73A (3-2-1) Specific Processing of Safety Monitoring Unit 73A in Sensor Operation Monitoring Step When the safety monitoring unit 73A recognizes in step SP1 of the safety monitoring procedure RT1 (FIG. 10) that a touch sensor 63 has operated or an obstacle has been detected through the image recognition process, it confirms the validly of the operation or the obstacle detection with a procedure RT3 for validly confirmation shown in FIG. 12.

That is, the safety monitoring unit 73A always monitors the pressure signals S1C given from the touch sensors 63 and the state signal S10 given from the state recognition unit 70 in step SP1 of the safety monitoring procedure RT1.

When the safety monitoring unit 73A recognizes based on the pressure signals S1C or the sate signal S10 that any touch sensor 63 has operated or an obstacle has been detected through the image recognition process, it starts the validly confirmation procedure RT3 from step SP20. In next step SP21, the safety monitoring unit 73A specifies the operating touch sensor 63 or the obstacle detected through the image recognition process, based on the pressure signals S1C from the touch sensors 63 or the state signal S10 from the state recognition unit 70.

The process proceeds to step SP22 where the safety monitoring unit 73A determines whether the operation of the touch sensor 63 or the detection of the obstacle is valid, based on the state signal S10 given from the state recognition unit 70, the action signal S11 given from the action determination unit 71, and the output torque signals $S2D_1$ to $S2D_{17}$ (FIG. 5) given from the actuators $A_1$ to $A_{17}$ (FIG. 5), by considering the current body conditions of the robot 1, and the position of the operating touch sensor 63 or the distance to the obstacle.

For example, assume that the robot 1 do not move the arm units 5A and 5B at all. There is little possibility of inserting a user's finger into a joint mechanism (shoulder joint mechanisms 20 and elbow joint mechanisms 24) of the upper body of the robot 1. Therefore, the operation of the touch sensors (surface contact switch $63F_1$ and $63F_2$ and tact switch $63T_1$ in FIG. 7 and FIG. 8) arranged at the upper body of the robot 1 can be ignored without problem. This means that safety level statuses such as insertion are detected based on criterions which are different depending on movement of the robot 1.

Further, even when the surface contact switch $63F_2$ (FIG. 7 and FIG. 8) on the inside of the elbow joint is pressed while the robot 1 is moving the elbow joint mechanism 24 (FIG. 1), the operation of this surface contact switch $63F_2$ can be ignored without problem when the output torque of the actuator $A_8$ of the elbow joint mechanism 24 is extremely small and the elbow joint mechanism 24 is not going to be bent further. This means that safety level statuses and countermeasures against the safety level statuses are determined by considering one or both of the body property of the robot 1, such as the actuators $A_1$ to $A_{17}$, and a next action.

Furthermore, when this robot 1 detects based on the acceleration signal S2B from the acceleration sensor 65 (FIG. 5) and the tact switches 63T$_6$ arranged on the soles of the foot blocks 32 (FIG. 7 and FIG. 8) of the leg units 6A and 6B that the robot 1 is being lifted up, the robot 1 changes own posture to a prescribed leaning posture and then causes weakness in the whole body by stopping the torque outputs of all the actuators $A_1$ to $A_{17}$. Therefore, there is little possibility of insertion of a user's finger into any joint mechanism (neck joint mechanism 13, shoulder joint mechanisms 20, elbow joint mechanisms 24, hip joint mechanisms 36, knee joint mechanisms 38 and ankle joint mechanisms 41) while the robot 1 is being lifted up. Thus the operation of all touch sensors 63 can be ignored without problem. This means that safety level statuses are determined by also considering the statuses and conditions of the robot 1.

Similarly, in a case where the robot 1 is located on a charging station, the robot 1 causes weakness in the lower body by stopping the torque outputs of the actuators $A_{12}$ to $A_{17}$ of the joint mechanisms (hip joint mechanisms 36, knee joint mechanisms 38, and ankle joint mechanisms 41) of the both leg units 6A and 6B. Therefore, there is little possibility of insertion of a user's finger into the joint mechanisms (hip joint mechanisms 36, knee joint mechanisms 38 and ankle joint mechanisms 41). Thus the operation of the touch sensors 63 arranged at the lower body of the robot 1 can be ignored without problem.

Further, even when an obstacle is detected while the robot 1 is walking, there is no fear that the obstacle blocks the robot 1 walking when the obstacle is off a walking path of the robot 1. As a result, the existence of the obstacle can be ignored without problem. This means that safety level statuses are determined by also considering a distance between the robot 1 and a detected obstacle.

Therefore, when any touch sensor 63 operates or an obstacle is detected through the image recognition process, the safety monitoring unit 73A determines the validly of the operation of the touch sensor 63 or the detection of the obstacle by considering the current body conditions of the robot 1. That is, by considering the current body conditions of the robot 1, the safety monitoring unit 73A determines whether there is a possibility that a user gets injured by inserting his/her finger at the position of the touch sensor 63, whether the obstacle or the robot 1 itself is broken due to the contact between each other, or whether the robot 1 is blocked.

When a negative result (a result determined as a safety level status) is obtained in step SP22, the process proceeds to step SP24 where the safety monitoring unit 73A terminates this validly confirmation procedure RT3, and then the process goes back to the safety monitoring procedure RT1. When a positive result is obtained in step SP22, the process goes on to step SP2 of the safety monitoring procedure RT1.

As described above, the safety monitoring unit 73A detects a safety level status with accuracy by considering the current body conditions of the robot 1 when any touch sensor 63 operates or an obstacle is detected through the image recognition process.

Figure 13:
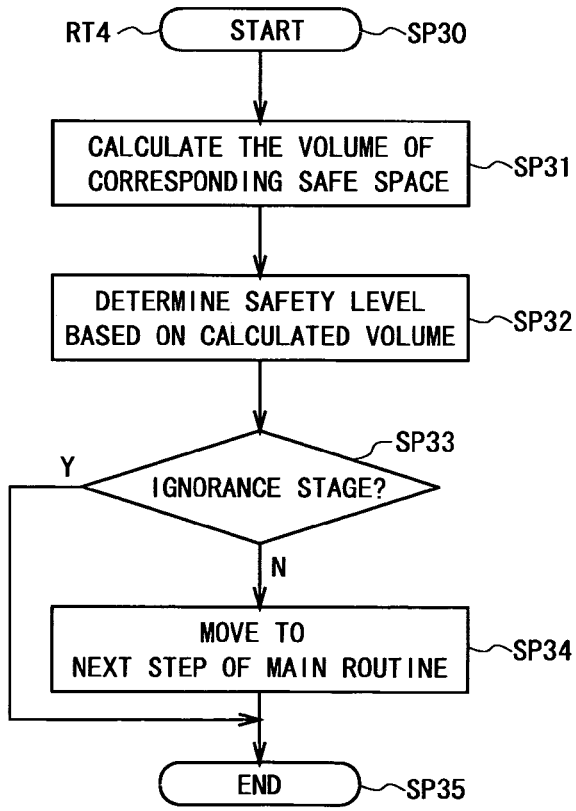
FIG. 13 is a flowchart showing a procedure for determining a safety level.

(3-2-2) Specific Processing of Safety Monitoring Unit 73A in Safety Level Status Detection Step The safety monitoring unit 73A executes the process of step SP2 of the safety monitoring procedure RT1 (FIG. 10) based on a procedure RT4 for determining a safety level shown in FIG. 13.

In step SP2 of the safety monitoring procedure RT1, the safety monitoring unit 73A starts this safety level determination procedure RT4 from step SP30. In next step SP31, the safety monitoring unit 73A calculates the volume of safe space associated with the touch sensor 63 of which the operation was determined as valid in step SP1 of the safety monitoring procedure RT1 or the volume of safe space associated with surroundings where the detection of the obstacle was determined as valid.

"Safe space" is space formed by body units of the robot 1 or by the body and surroundings. In this embodiment, safe space formed by two links connected to each other via one joint mechanism is defined as space between two links for which a safety level is set according to the angle between the two links. For example, as to the thigh block 30 and shin block 31 of the leg unit 6A, 6B, space at the back of the knee joint mechanisms 38 indicated by an arrow PO$_1$ in FIG. 14 corresponds to the safe space.

Figure 16:
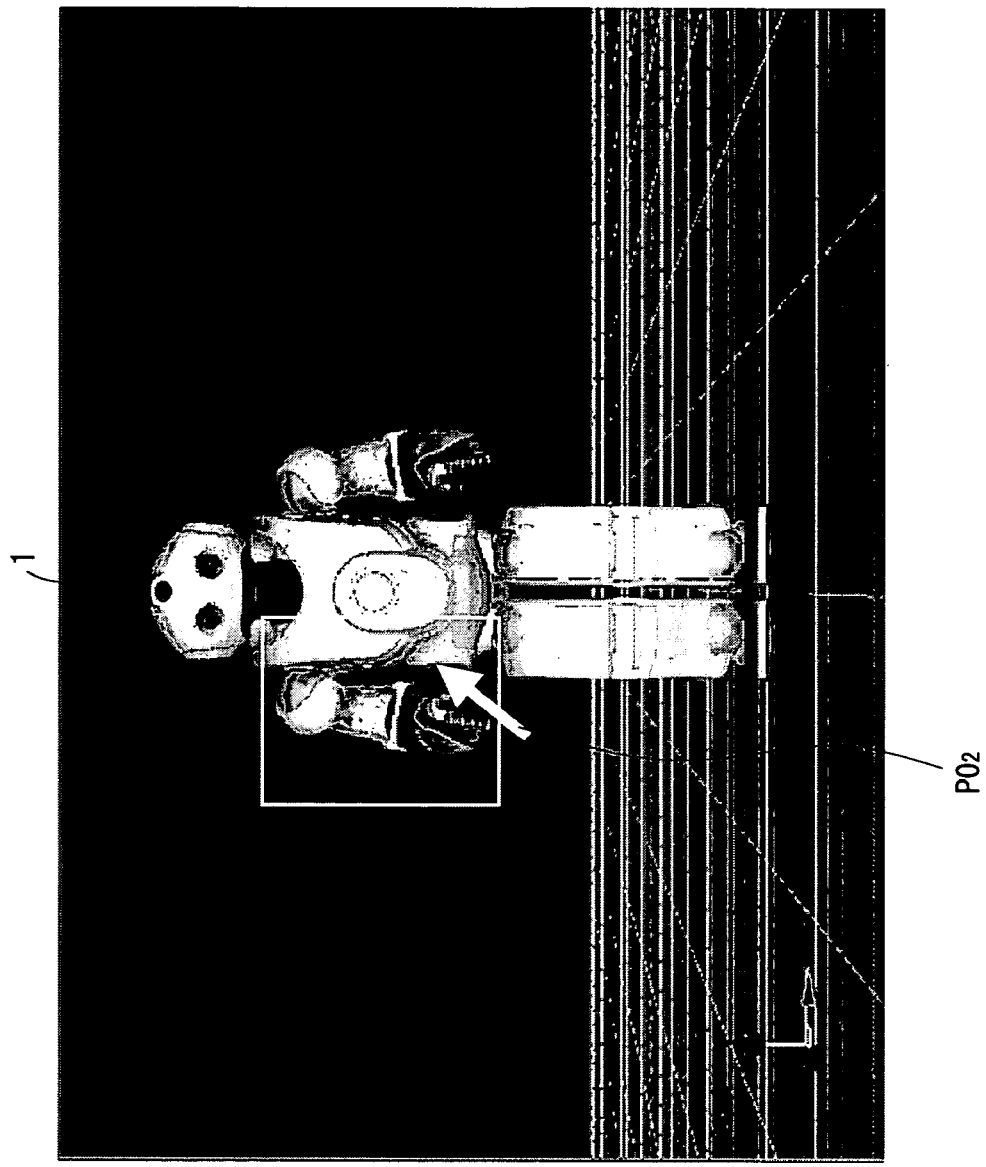
FIG. 16 is a conceptual view explaining safe space formed by plural links.

Further, in this embodiment, safe space formed by two links connected to each other via one or plural links is defined as space between the two links for which a safety level is set according to the distance between the two links. For example, as to the forearm block 16 of the arm unit 5A, 5B and the body unit 2, space between the forearm block 16 and the body unit 2 indicated by an arrow PO$_2$ in FIG. 16 corresponds to the safe space.

Figure 18:
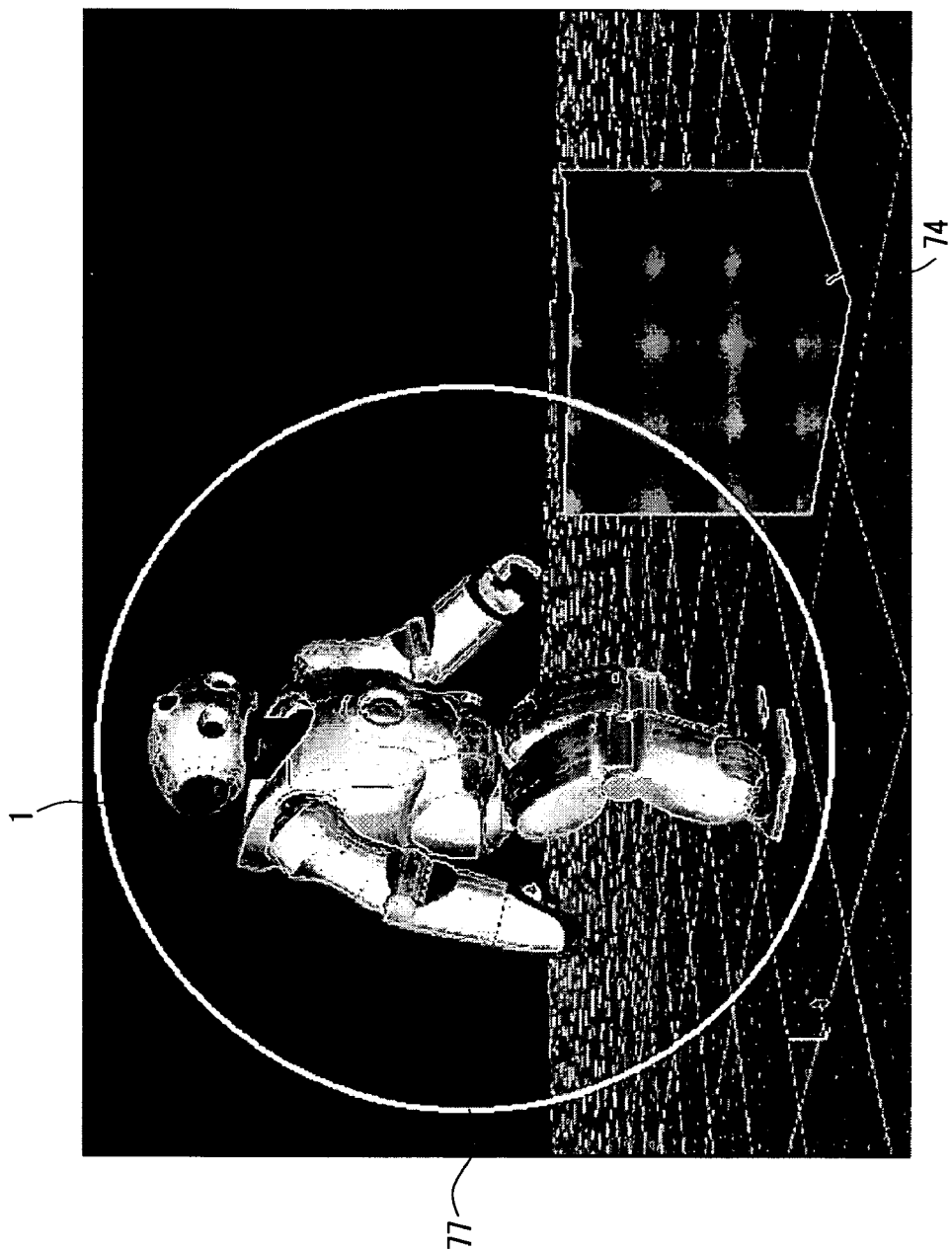
FIG. 18 is a conceptual view explaining safe space formed by the robot and surroundings.

Furthermore, in this embodiment, safe space formed by the body of the robot 1 and surroundings is defined as space for which a weight regarding to danger or safety, for example, a safety level is set according to the distance between the body and an object, for example, an external obstacle or part of own body. In this embodiment, space between the robot 1 and an obstacle 74 in FIG. 18 corresponds to the safe space, for example.

These definitions of "safe space" are just examples. Other definitions can be applied.

In this robot 1, safe space is set to each position where a touch sensor 64 detects a safety level status.

Figure 15C:
FIGS. 15A to 15D are conceptual views explaining safety levels of the safe space formed by the single joint mechanism.
Figure 15D:
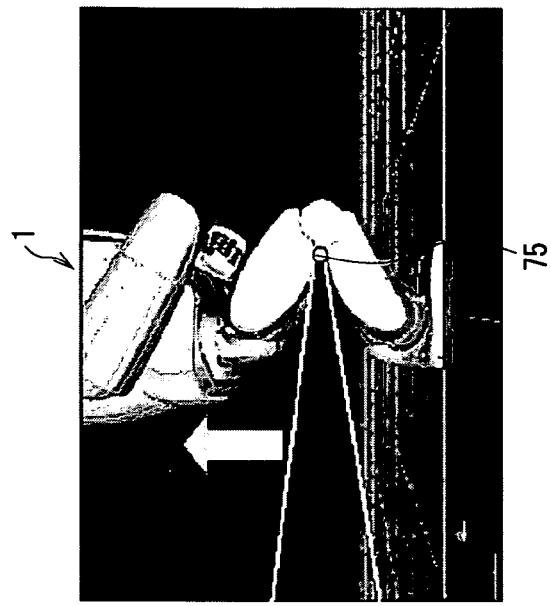
Figure 15A:
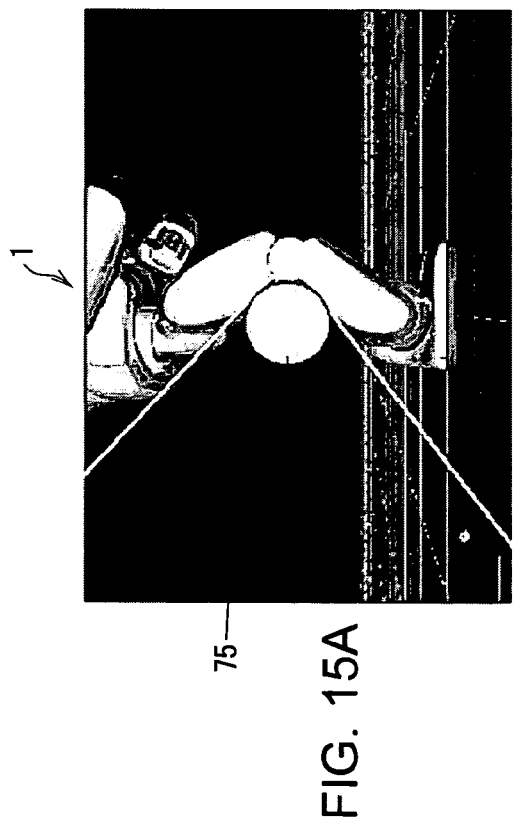

The "volume" of safe space, on the other hand, is a barometer representing the size of the safe space in a fixed quantity manner. In this embodiment, as to safe space formed by a single joint mechanism, as shown in FIG. 15A, the volume of a column 75 which contacts with two links being connected to each other via the joint mechanism on the bending sides of the two links and of which the central axis is orthogonal to the two links is defined as "volume".

Figure 17C:
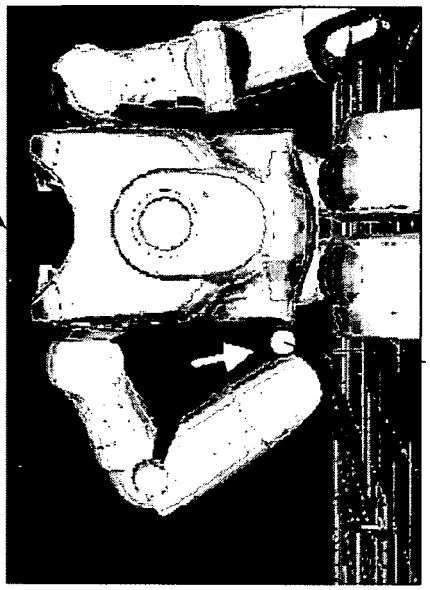
FIGS. 17A to 17C are conceptual views explaining safety levels of the safe space formed by the plural links.
Figure 17A:
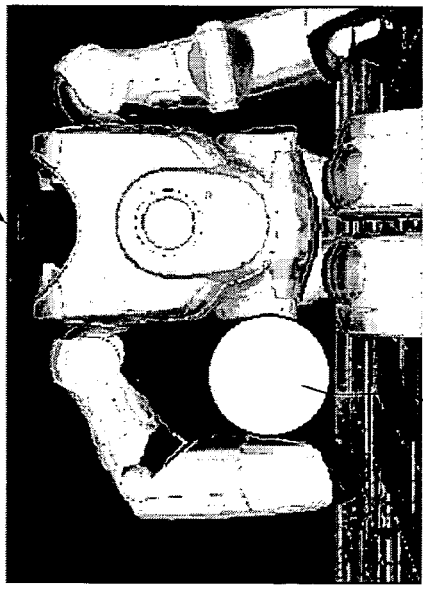
Figure 19C:
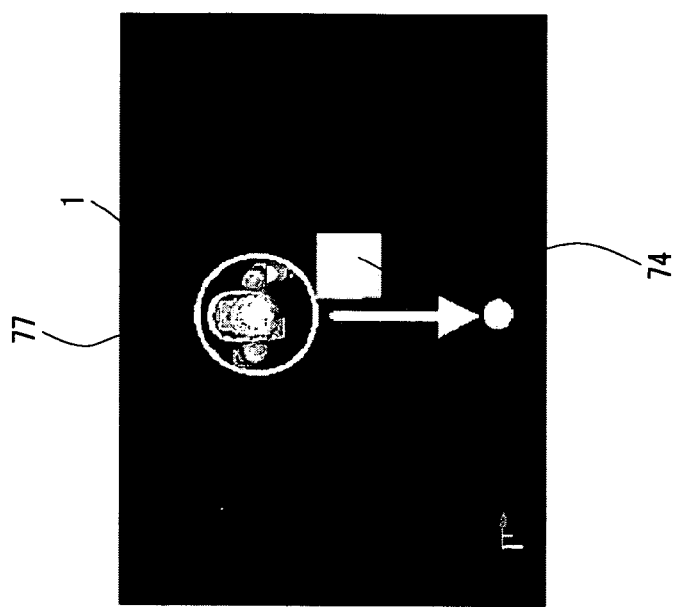
FIGS. 19A to 19C are conceptual views explaining safety levels of the safe space formed by the robot and the surroundings.
Figure 19A:
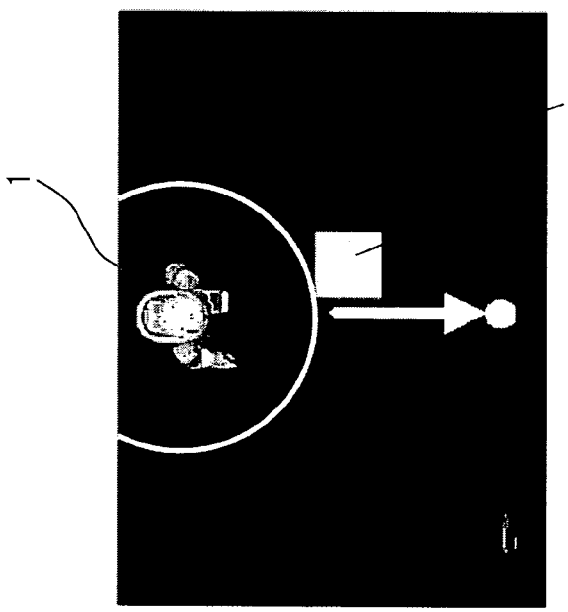
Figure 19B:
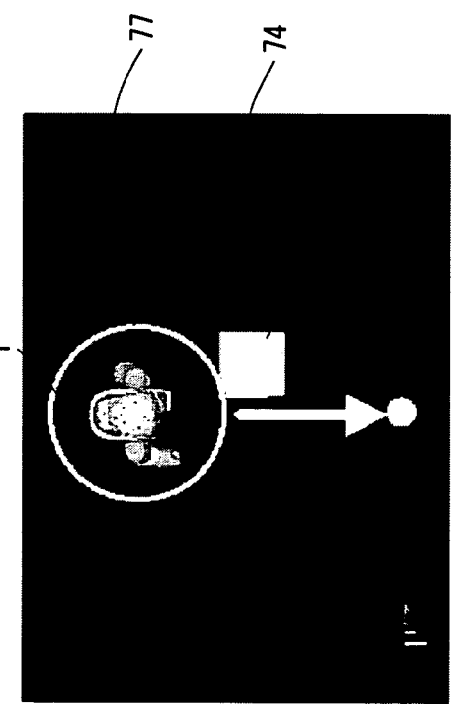

Further, in this embodiment, as to safe space formed by two links being connected via one or plural links, as shown in FIG. 17A, the volume of a column 76 which contacts with the inside of the two links at a position where a distance between the two links is the shortest is defined as "volume". Furthermore, as safe space formed by the robot 1 and surroundings, as shown in FIG. 19B, the volume of a sphere 77 with the robot 1 as a center and with a distance between the robot 1 and the obstacle as a diameter is defined as "volume".

Note that these definitions of "volume" of safe space are just examples and such definitions that the above volumes are approximated by size and angle can be applied, provided that the volume of safe space can be represented in a fixed quantity manner.

Figure 20:
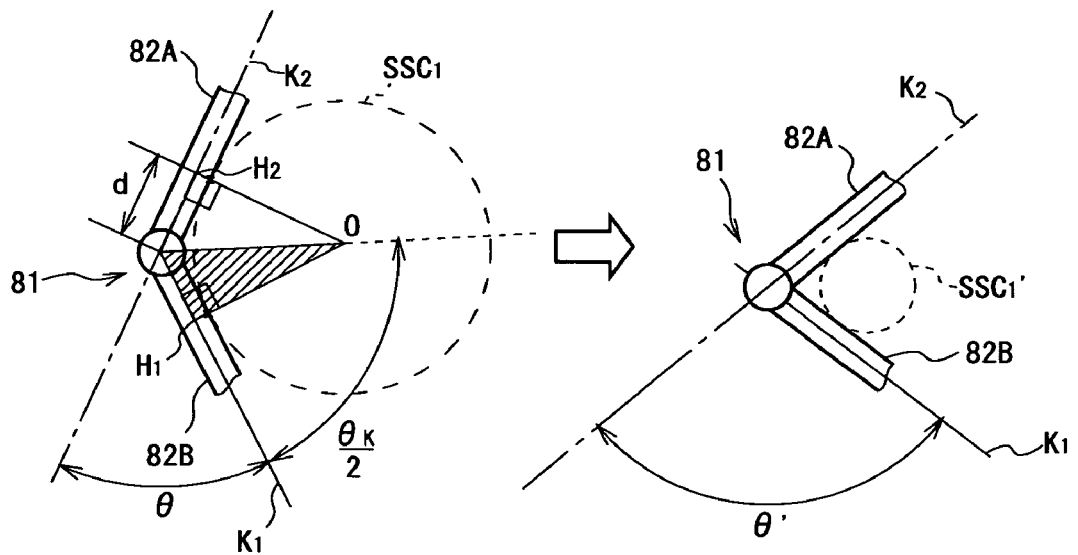
FIG. 20 is a schematic diagram explaining how to calculate the volume of safe space formed by a single joint mechanism.

Consider a case of safe space formed by the first and second links 82A and 82B being connected to each other via one joint mechanism 81 as shown in FIG. 20. With the above-described definitions of the "volume" of safe space in this embodiment, by assuming that a cross-sectional area of the first and second links 82A and 82B is a square, the "volume" of this safe space can be calculated as the area of a circle (hereinafter, referred to as safe space definition circle) $SSC_1$ which contacts with the first and second links 82A and 82B on the bending side of the joint mechanism 81.

In this case, assume that the current angle is "θ" with the initial angle of the joint mechanism 81 as "0", the radius of the circle is r, the distance from the rotational center J of the joint mechanism 81 to the position of the touch sensor 63 (to each of the bottoms $H_1$ and $H_2$ of perpendiculars drawn from the center O of the circle toward the central lines $K_1$ and $K_2$ of the first and second links 82A, 82B) is d. An angle $\theta_k$ between the first and second links 82A and 82B is derived from the following equation (1).

$$\theta_k = \pi - \theta \tag{1}$$

Since the center O of the safe space definition circle $SSC_1$ exists on the bisector of the interior angle $\theta_k$ and exists on a line passing a contacting point of the first or second link 82A and 82B and the safe space definition circle SSC out of normal of the first and second links 82A and 82B, the radius $r_1$ of the safe space definition circle $SSC_1$ is derived from the following equation (2).

$$r = d \tan\left[\frac{\theta_k}{2}\right] \tag{2}$$

Therefore, the size a of the safe space definition circle $SSC_1$ of this case is calculated by the following equation (3) as an area depending on the output angle of the joint mechanism 81.

$$a = \pi \left[d \tan\left[\frac{\pi - \theta}{2}\right]\right]^2 \tag{3}$$

Figures 21A, 21B:
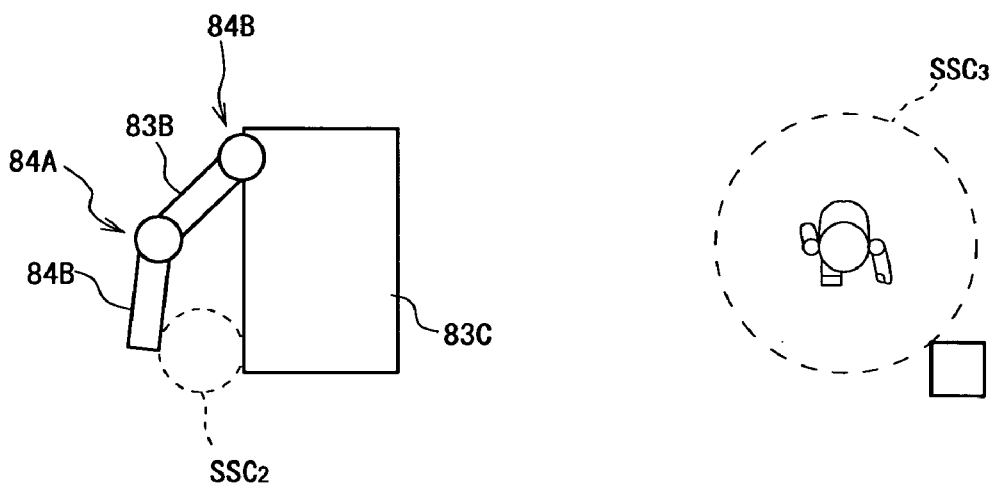
FIGS. 21A and 21B are schematic diagrams explaining how to calculate the volumes of safe spaces formed by plural links and with surroundings.

Similarly, as shown in FIG. 21A, considering safe space corresponding to the first and second links 83A and 83B being connected via a plurality of joint mechanisms 84A and 84B. The volume of this safe space can be calculated as the size of a safe space definition circle $SSC_2$ which contacts with the first and second links 83A and 83C. This size of the safe space definition circle $SSC_2$ can be calculated based on the reflective indexes of the joint mechanisms 84A and 84B and the shapes of the links 83A to 83C.

In addition, as shown in FIG. 21B, the volume of safe space between the robot 1 and surroundings is calculated as the size of a safe space definition circle $SSC_3$ with a distance between the robot 1 and an obstacle as a radius and with the robot 1 as a center. Then this size of the safe space definition circle $SSC_3$ can be calculated based on the distance from the robot 1 to the obstacle.

As described above, in step SP31 of the safety level determination procedure RT4, the volume of corresponding safe space is calculated based on the angle signals $S2C_1$ to $S2C_{17}$ given from the potential meters $P_1$ to $P_{17}$, information on the shape of each link (upper arm block 15, forearm block 16 and hand block 17 of each arm unit 5A, 5B, body unit 2, and thigh block 30 and shin block 31 of each leg unit 6A, 6B) being stored in the external memory 66, and/or the state signal S10 given from the state recognition unit 70.

Referring back to FIG. 13, the process proceeds to step SP32 where the safety monitoring unit 73A determines the safety level of the safe space based on the volume of the safe space calculated as described above.

Figure 17B:
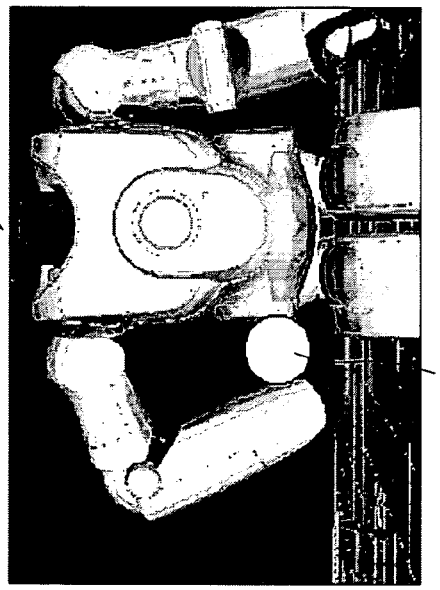

"Safety level" indicates the safety level in safe space. In the robot 1 of this embodiment, this "safety level" includes a timing of a potential risk with an ignorance stage which is identified as safe (for example, FIG. ISA, FIG. 17A and FIG. 19A), a warning stage which is identified as having some time to insertion or contact with an obstacle (for example, FIG. 15B, FIG. 17B and FIG. 19B), and an emergent stage which is identified as a status where insertion or contact with an obstacle will happen in the near future (for example, FIG. 15C, FIG. 17C and FIG. 19C). Specifically, as to safe space at the back of the knee joint mechanisms 38 of the leg units 6A and 6B (see FIG. 14) and safe space formed by the robot 1 and surroundings, an emergency prevention stage which is identified as a status where the insertion has occurred or an obstacle is very close (For example, FIG. 15D) is also prepared as the "safety level". Such "safety level" is prescribed by considering the torque output capability of the actuators A± to A17, a joint angle formed by links, a planned action and so on together. However, this prescription is not limited to this and other elements can be considered as well.

In this robot 1, as a means for determining the safety level of safe space based on the volume of the safe space, a first table (hereinafter, referred to as a first safe space management table) 85 as shown in FIG. 22 is previously stored in the external memory 66 (FIG. 5). This first safe space management table 85 contains, for each safe space formed by a single joint mechanism, the position of the safe space ("space"), sensor corresponding to the safe space ("sensor"), the position of the sensor ("position of sensor"), a joint axis controlling the volume of the safe space ("relevant joint"), maximum values of the volume for the ignorance stage, warning stage and emergent stage of the safe space ("threshold value 1", "threshold value 2", and "threshold value 3", respectively), the amount of prevention for a case of emergency prevention ("emergency prevention amount"), and a countermeasure table 90, 91 specifying countermeasures corresponding to the safe space (FIG. 27 and FIG. 28) ("countermeasure type) which will be described later, in a relational structure.

In a case where any of the touch sensors registered in the first safety management table 85 operates, the safety monitoring unit 73A is able to immediately recognize, by reference to this first safety management table 85, the position of the safe space corresponding to the operating touch sensor 63, the position of the touch sensor 63, and an axis which should be driven for countermeasures, which will be described later, and the maximum values of the volume of the safe space for the ignorance stage, warning stage and emergent stage.

Further, as shown in FIG. 23 and FIG. 24, the external memory 66 (FIG. 5) of the robot 1 previously stores second and third tables (hereinafter, refereed to as second and third safe space management tables, respectively) 86 and 87 which contain, for each safe space formed by plural links and each safe space formed by the robot and surroundings, the position of the safe space, a sensor corresponding to the safe space, the position of the sensor, a joint axis which increases or decreases the volume of the safe space, the maximum values of the volume of the safe space for the ignorance stage, warning stage, and emergent stage, the amount of prevention in a case of emergency prevention, and the second or third countermeasure table 91, 92 (FIG. 28, 29) corresponding to the safe space which will be described later.

Therefore, in step SP32, the safety monitoring unit 73A compares the volume of the safe space obtained in step SP31 with the maximum values of the ignorance stage, warning stage and emergent stage for the corresponding safe space described in the corresponding first to third safe space management table 85 to 87 being stored in the external memory 66, to determine the current safety level of the safe space based on the comparison result.

For example, in a case where the touch sensor 63 (surface contact switch 63F$_5$ of FIG. 9) at the back of the left-knee joint mechanism 38 operates validly, the safety monitoring unit 73A sequentially compares the volume of the safe space at the back of the left-knee joint mechanism 38 calculated in step SP31 with the maximum values $m_3(s_i)$, $n_2(s_i)$, and $l_1(s_i)$ of the ignorance stage, warning stage and emergent stage in the first safety management table 85 (FIG. 22). When the volume is equal to or under the maximum value of $m_3(s_i)$ of the ignorance stage, the safety monitoring unit 73A determines that the current safety level of the safe space is in the ignorance stage. When the volume is greater than the maximum value of $m_3(s_i)$ of the ignorance stage and equal to or under the maximum value of $n_1(s_i)$ of the warning stage, the safety monitoring unit 73A determines that the current safety level of the safe space is in the warning stage. When the volume is greater than the maximum value of $n_3(s_i)$ of the warning stage and equal to or under the maximum value $l_1(s_i)$ of the emergent stage, the safety monitoring unit 73A determines that the current safety level of the safe space is in the emergent stage. When the volume is greater than the maximum value of $l_1(s_i)$ of the emergent stage, the safety monitoring unit 73A determines that the current safety level of the safe space is in the emergency prevention stage.

When the safety monitoring unit 73A determines that the current safety level of the safe space thus obtained is in the ignorance stage, the process goes on to step SP35 where the safety monitoring unit 73A terminates this safety level determination procedure RT4 (FIG. 13) and the process returns to the safety monitoring procedure RT1 (FIG. 10), and then returns back to step SP1 of this procedure RT1.

When the safety monitoring unit 73A determines that the current safety level of the safe space is in the emergent stage or emergency prevention stage, on the other hand, the process goes on to step SP34 to return back to the safety monitoring procedure RT1 (FIG. 10) and then goes on to step SP2 of this procedure RT1.

As described above, when any of the touch sensors 63 operates or an obstacle is detected through the image recognition process, the safety monitoring unit 73A can determine based on the volume of the corresponding safe space whether to make the robot 1 take countermeasures.

Note that $m_1(s_i)$–$m_{19}(s_i)$, $n_1(s_i)$–$n_{19}(s_i)$–$l_1(s_i)$–$l_3(s_i)$, $p_1(s_i)$–$p_3(s_i)$ in FIG. 22 to FIG. 24 are specific parameter values in a unit of, for example, a preset prescribed size (for example, an average thickness of the forefingers of adult men) as shown in FIG. 25A to 25C. In this embodiment, the safety monitoring unit 73A changes these parameter values according to the current body conditions $(s_i)$ of the robot 1. That is, in FIG. 22 to FIG. 24, si represents body conditions, and $m_1(s_i)$–$m_{19}(s_i)$, $n_1(s_i)$–$n_{19}(s_i)$, $l_1(s_i)$–$l_3(s_i)$, $p_1(s_i)$–$p_3(s_i)$ represent specific parameter values previously set to the body conditions.

That is, in this case of the robot 1, the body conditions of the robot 1 which will be described later are classified into five categories: "station $(s_3)$" where the robot 1 is on a charging station, "lifted $(s_4)$" where the robot 1 is lifted up, "recovering $(s_5)$" where the robot 1 is standing up from a lying state, "standing $(s_1)$" where the robot 1 is moving with the right and left leg units grounded, and "moving on floor $(s_2)$" other than these categories (refer to FIG. 27 to FIG. 29). When a safety level status in danger is detected, countermeasures to be taken by the robot 1 against the safety level status are selected depending on which category the current body conditions $(s_i)$ (i=1, 2, . . . , 5) of the robot 1 are in.

In addition, the external memory 66 (FIG. 5) stores the prescribed values of the parameter values for body conditions as shown in FIG. 25A to FIG. 25C in association with the categories of the body conditions, for the first to third safe space management tables 85 to 87.

When the volume of the safe space calculated in step SP31 is compared with the maximum values of the ignorance stage, etc. of the corresponding safe space prescribed in the corresponding first to third safe space management table 85 to 87 in step SP32 of the safety level determination procedure RT4 (FIG. 13), the safety monitoring unit 73A first determines the current body conditions of the robot 1 based on the action signal S11 (FIG. 6) from the action determination unit 71 and the angle signals $S2C_1$ to $S2C_{17}$ from the potential meters $P_1$ to $P_{17}$ (FIG. 5), retrieves the parameter values $m_1(s_i)$–$m_{19}(s_i)$, $n_1(s_i)$–$n_{19}(s_i)$, $l_1(s_i)$–$l_3(s_i)$, $p_1(s_i)$–$P_3(s_i)$ from the corresponding first to third safe space management table 85 to 87 in the external memory 66 according to the body conditions, and rewrites the first to third safe space management table 85 to 87. After that, the safety monitoring unit 73A performs the comparison process.

As described above, even while detecting the safety level of each safe space, this robot 1 is able to detect a safety level status in conditions optimal to the body conditions of the robot 1.

(3-3) Specific Processing of Countermeasure Creation Unit 73B (3-3-1) Processing of Countermeasure Creation Unit 73B in Progress Determination Step The processing contents of the countermeasure creation unit 73B in step SP11 of the countermeasure creation procedure RT2 (FIG. 11) will be now described.

In the robot 1 according to this embodiment, based on the following three considerations:
1. if only certain part of the robot 1 stops, this part may block other parts moving;
2. since the robot 1 keeps its posture by only the lower body while moving by using the leg units 6A and 6B, movement of the lower body and movement of the upper body can be separated; and
3. a safety level status with a higher safety level may happen while the robot 1 is taking countermeasures, safety level statuses are divided into four categories: "case where the safety level of any safe space reaches the warning stage"; "case where the safety level of safe space formed by the robot 1 and surroundings reaches the emergent stage"; "case where the safety level of any safe space in the upper body reaches the emergent stage"; and "case where the safety level of any safe space in the lower body reaches the emergent stage".

Then the countermeasure creation unit 73B determines whether to keep the current countermeasures in step SP11 of the above-described countermeasure creation procedure RT2 (FIG. 11), under three rules:
1. keep the current countermeasures to the end, without changing the countermeasures, even if the safety level of the safe space having the safety level status against which the countermeasures are being taken varies;
2. change the countermeasures when a safety level status in danger with a higher priority than that against which the countermeasures are being taken is detected in another safe space;
3. the priority order of safety level statuses is "case where the safety level of any safe space reaches the warning stage", "case where the safety level of safe space formed by the robot and surroundings reaches the emergent stage", "case where the safety level of any safe space in the upper body reaches the emergent stage", and "case where the safety level of any safe space in the lower body reaches the emergent stage".

That is, when the process proceeds to step SP11 of the above-described countermeasure creation procedure RT2 (FIG. 11), the countermeasure creation unit 73B determines whether a countermeasure changing command has arrived from the safety monitoring unit 73A. When a negative result is obtained, the process goes on to step SP12.

When an affirmative result is obtained in this step SP11, on the contrary, the countermeasure creation unit 73B detects the position and safety level of the safe space having the safety level status against which the countermeasures are being taken and the position and safety level of the safe space having the newly detected safety level status, with the same way as that described above in step SP2 of the safety monitoring procedure RT1. Then the countermeasure creation unit 73B determines which safety level status has a higher priority.

When the countermeasure creation unit 73B determines that the safety level status against which the countermeasures are being taken has a higher priority, the process goes on to step S12. When it is determined that the new safety level status has a higher priority, on the other hand, the process goes on to step SP13.

Figure 26:
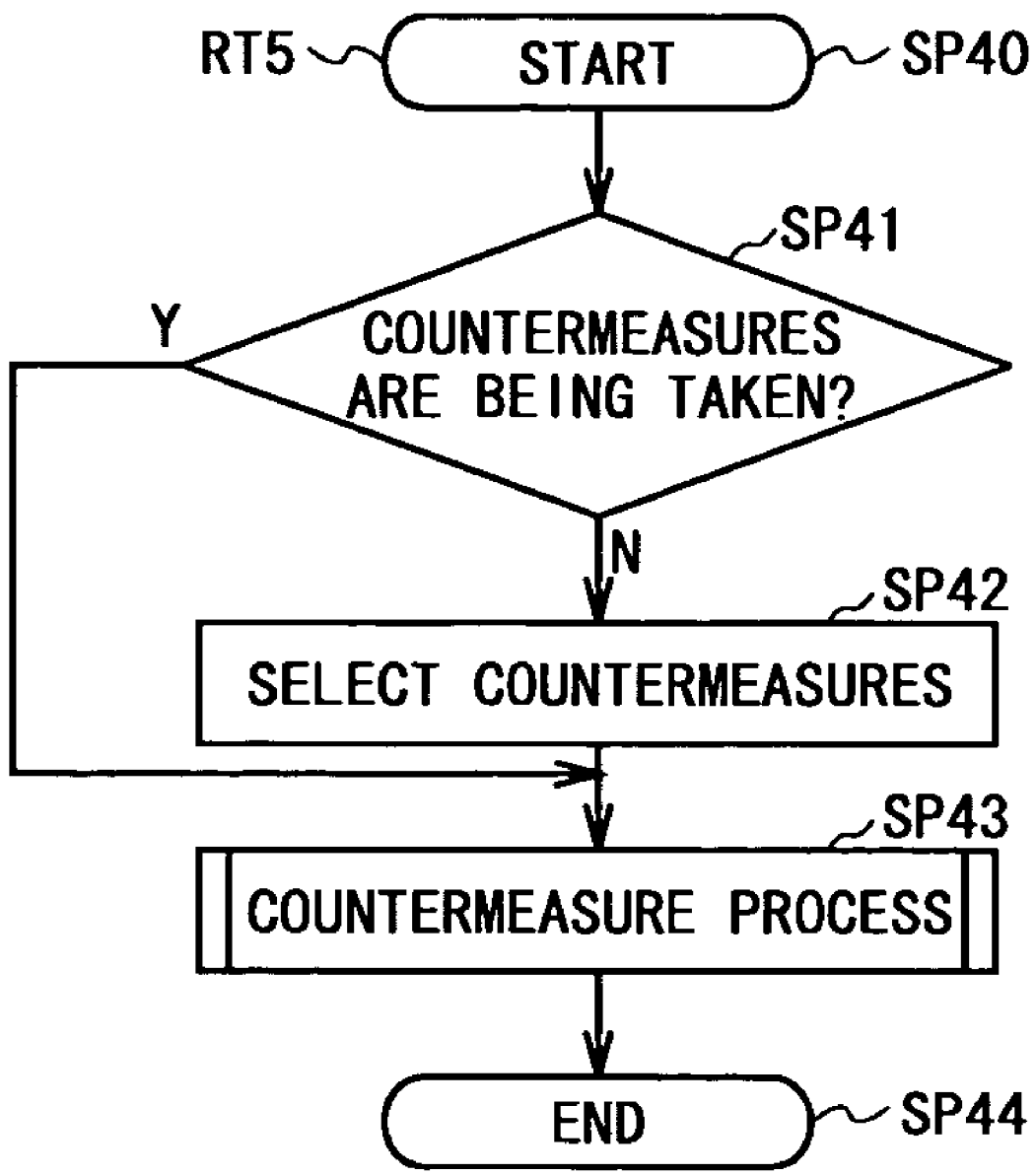
FIG. 26 is a flowchart showing a procedure for countermeasure selection/implementation.

(3-3-2) Processing of Countermeasure Creation Unit 73B in Countermeasure Creation Step The countermeasure creation unit 73B performs the process of the first step SP12 of the countermeasure creation procedure RT2 (FIG. 11) based on a procedure RT5 for countermeasure selection/implementation shown in FIG. 26.

That is, when the process enters into step SP12 of the countermeasure creation procedure RT2, the countermeasure creation unit 73B starts this countermeasure selection/implementation procedure RT5 from step SP40, and determines in next step SP41 whether the robot 1 is taking some countermeasures.

When the countermeasure creation unit 73B obtains an affirmative result in step SP41, the process goes on to step SP43. When a negative result is obtained, on the contrary, the process goes on to step SP42 where the countermeasure creation unit 73B selects appropriate countermeasures based on the position and safety level of the safe space having the safety level status which is detected in step SP11 of the above-described countermeasure creation procedure RT2 and should be managed.

In the robot 1, based on the position and safety level of safe space having a safety level status to be managed, as a means for selecting appropriate countermeasures, the body conditions of the robot 1 are classified into five categories: "station" in which the robot 1 is on the charging station; "lifted" in which the robot 1 is lifted up; "recovering" in which the robot 1 is standing up from a lying state; "standing" in which the robot 1 is moving with the right and left leg units grounded; and "moving on floor" other than the above categories.

The external memory 66 (FIG. 5) stores the first to third tables (hereinafter, referred to first to third countermeasure tables) 90-92 specifying the contents of countermeasures to be taken for each case where the safety level of the current safety level status is in the ignorance stage, warning stage, emergent stage or emergency prevention stage, for each of the above categories. The first countermeasure table 90 prescribes, for each category, countermeasures to be taken in a case where a safety level status in danger is detected in any safe space defined for the upper body of the robot 1. The second countermeasure table 91 prescribes, for each category, countermeasures to be taken in a case whether a safety level status in danger is detected in any safe space defined for the lower body of the robot 1. The third countermeasure table 92 prescribes, for each category, countermeasures to be taken in a case where a safety level status in danger is detected in safe space formed by the robot 1 and surroundings.

Further, as described above with reference to FIG. 22 to FIG. 24, the first to third safety management tables 85 to 87 describe the corresponding first to third countermeasure tables 90-92 to be accessed at a time of selecting countermeasures for each safe space described in the first to third safety management tables 85 to 87 ("countermeasure type" in FIG. 22 to FIG. 24).

When the process goes on to step SP42 of the countermeasure selection/implementation procedure RT5, the countermeasure creation unit 73B uses the corresponding first to third safety management table 85 to 87 to determine which countermeasure table 90-92 the safe space having the safety level status is associated with, and confirms the current body conditions of the robot 1 based on the action signal S11 given from the action determination unit 71 (FIG. 6) and the angle signals $S2C_1$ to $S2C_{17}$ given from the potential meters $P_1$ to $P_{17}$.

Then by using the first to third countermeasure table 90-92 associated with the safe space having the safety level status to be managed, the countermeasure creation unit 73B selects appropriate countermeasures based on the current body conditions of the robot 1 and the current safety level of the safe space having the safety level status to be managed, notified from the safety monitoring unit 73A.

Then the process goes on to step SP43 where the countermeasure creation unit 73B makes the robot 1 take the countermeasures thus selected. Then the process goes on to step SP44 where the countermeasure creation unit 73B terminates this countermeasure selection/implementation procedure RT5.

The specific countermeasures to be implemented in step SP43 of the countermeasure selection/implementation procedure RT5 are prescribed in the first to third countermeasure tables 90-92 described above with reference to FIG. 27 to FIG. 29. Although detailed countermeasures are different according to the position and safety level of safe space having a safety level status, the countermeasures are roughly the same in each category: "case where the safety level of any safe space reaches the warning stage"; "case where the safety level of any safe space in the upper body reaches the emergent stage"; and "case where the safety level of any safe space in the lower body reaches the emergent stage".

In other words, similar countermeasures are taken in a case where the safety level of safe space having a safety level status is in the warning stage, regardless of where the safe space is. In addition, similar countermeasures are taken in a case where the safe space having a safety level status is in the upper body of the robot 1 and its safety level is in the emergent stage, regardless of the position of the safe space in the upper body of the robot 1. Similarly, similar countermeasures are taken in a case where the safe space having a safety level status is in the lower body of the robot 1 and its safety level is in the emergent stage, regardless of the position of the safe space in the lower body of the robot 1.

Figure 30:
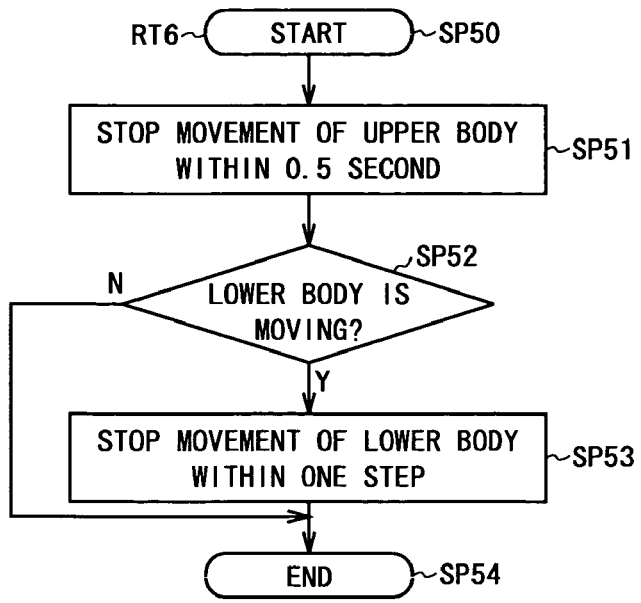
FIG. 30 is a flowchart showing a procedure for countermeasures in a warning stage.

In a case where the countermeasures selected in step SP42 of the countermeasure selection/implementation procedure RT5 are countermeasures against the "case where the safety level of any safe space reaches the warning stage" (countermeasures described in the "warning stage" of a first to third countermeasure table 90-92 shown in FIGS. 27 to 29), the countermeasure creation unit 73B gradually stops the movement of the robot 1 while keeping the body protection of the robot 1 with a procedure RT6 for countermeasures in the warning stage shown in FIG. 30.

That is, when countermeasures against the "case where the safety level of any safe space reaches the warning stage" are selected in step SP42 of the countermeasure selection/implementation procedure RT5 (FIG. 26), the process goes on to step SP43 where the countermeasure creation unit 73B starts the warning-stage countermeasure procedure RT6 (FIG. 30) from step SP50. In next step SP51, in a case where the safe space having the safety level of the warning stage is in the upper body of the robot 1, the countermeasure creation unit 73B sends to the action determination unit 71 (FIG. 6) a command instructing to stop and cause weakness in the joint mechanisms (neck joint mechanism 13, shoulder joint mechanisms 20, elbow joint mechanisms 24, and waist joint mechanism 44) of the upper body associated with the safe space and the joint mechanisms of the upper body attached to them within 0.5 second.

Thus the action determination unit 71 sends an action signal S11 to the action creation unit 72 according to the command. The action creation unit 72 controls the relevant actuators $A_1$ to $A_{11}$ according to this action signal S11 so as to gradually stop the movement of the relevant joint mechanisms of the upper body of the robot 1 and then cause weakness in the joint mechanisms (that is, so that the output torque becomes "0").

Then the process goes on to step SP52 where the countermeasure creation unit 73B determines based on the action signal S11 given from the action determination unit 71 whether the robot 1 is moving the joint mechanisms (hip joint mechanisms 36, knee joint mechanisms 38, and ankle joint mechanisms 41) of the lower body. When a negative result is obtained, the process goes on to step SP54 where the countermeasure creation unit 73B terminates this warning-stage countermeasure procedure RT6.

When an affirmative result is obtained in step SP52, on the contrary, the process goes on to step SP53 where the countermeasure creation unit 73B sends to the action determination unit 71 a command instructing to stop the movement of all joint mechanisms (hip joint mechanisms 36, knee joint mechanisms 38 and ankle joint mechanisms 41) of the lower body of the robot 1 within one step.

At this time, the action determination unit 71 sends an action signal S11 to the action creation unit 72 according to this command. The action creation unit 72 controls the relevant actuators $A_1$ to $A_{11}$ according to the action signal S11 so as to gradually stop the movement of the lower body within one step but so that the robot 1 does not fall down.

Then the process goes on to step SP54 where the countermeasure creation unit 73B terminates this warning-stage countermeasure procedure RT6.

Figure 31:
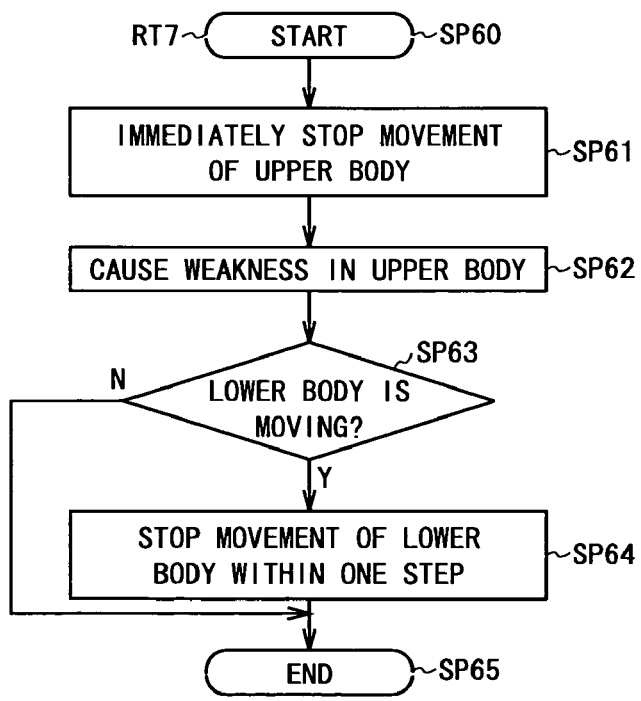
FIG. 31 is a flowchart showing a procedure for countermeasures for upper body in an emergent stage.

Further, in a case where countermeasures selected in step SP42 of the countermeasure selection/implementation procedure RT5 are countermeasures against the "case where the safety level of any safe space of the upper body reaches the emergent stage" (countermeasures described in "emergent stage" of the first countermeasure table shown in FIG. 27), the countermeasure creation unit 73B does not consider the body protection of the robot 1 and immediately stops the movement of the robot 1 based on a procedure RT7 for countermeasures for upper body in the emergent stage shown in FIG. 31.

That is, when countermeasures against the "case where the safety level of any safe space of the upper body reaches the emergent stage" are selected in step SP42 of the countermeasure selection/implementation procedure RT5 (FIG. 26), the process goes on to step SP43 where the countermeasure creation unit 73B starts the upper-body emergent-stage countermeasure procedure RT7 (FIG. 31) from step SP60. In following step SP61, the countermeasure creation unit 73B sends to the action determination unit 71 (FIG. 6) a command instructing to immediately stop the movement of all joint mechanisms (neck joint mechanism 13, shoulder joint mechanisms 20, elbow joint mechanisms 24 and waist joint mechanism 44) of the upper body of the robot 1.

At this time, the action determination unit 71 sends an action signal S11 to the action creation unit 72 according to the command. The action creation unit 72 controls the relevant actuators $A_1$ to $A_{11}$ according to the action signal S11 so as to immediately stop the movement of all joint mechanisms of the upper body of the robot 1.

Then the process goes on to step SP62 where the countermeasure creation unit 73B sends to the action determination unit 71 a command instructing to cause weakness in the joint mechanisms of which the movement was immediately stopped. Thus the action determination unit 71 sends to the action creation unit 72 an action signal S11 according to this command. The action creation unit 72 controls the relevant actuators $A_1$ to $A_{17}$ according to the action signal S11 so as to cause weakness in the joint mechanisms (that is, so that the output torque becomes "0").

In next step SP63, the countermeasure creation unit 73B determines based on the action signal S11 given from the action determination unit 71 whether the robot 2 is moving joint mechanisms of the lower body. When a negative result is obtained, the process goes on to step SP65 where the countermeasure creation unit 7B terminates this upper-body emergent-stage countermeasure procedure RT7.

When an affirmative result is obtained in step SP63, the process goes on to step SP64 where the countermeasure creation unit 73B sends to the action creation unit 71 a command instructing to stop the movement of all joint mechanisms of the lower body of the robot 1 within one step. The action determination unit 71 sends an action signal S11 to the action creation unit 72 according to this command. The action creation unit 72 controls the relevant actuators $A_1$ to $A_{11}$ according to this action signal S11 so as to gradually stop the movement of the lower body within one step.

Then the process proceeds to step SP65 where the action creation unit 72 terminates this upper-body emergent-stage countermeasure procedure RT7.

Figure 14:
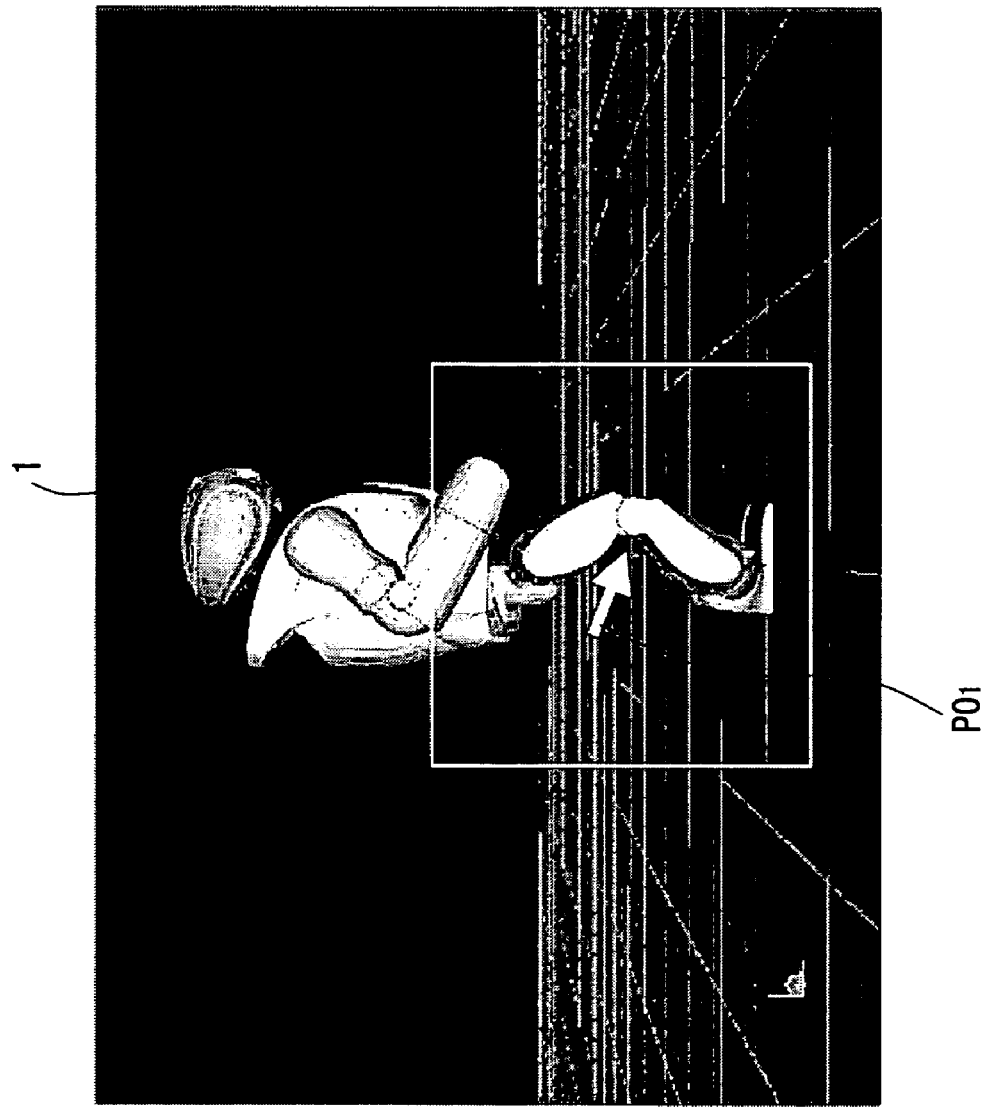
FIG. 14 is a conceptual view explaining safe space formed by a single joint mechanism.
Figure 15B:
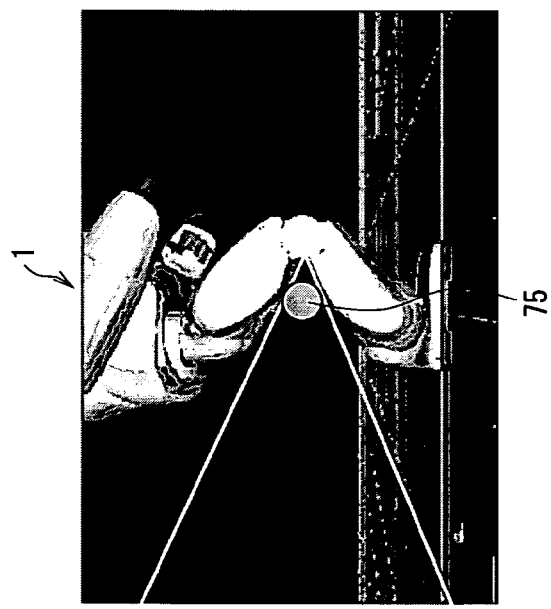
Figure 32:
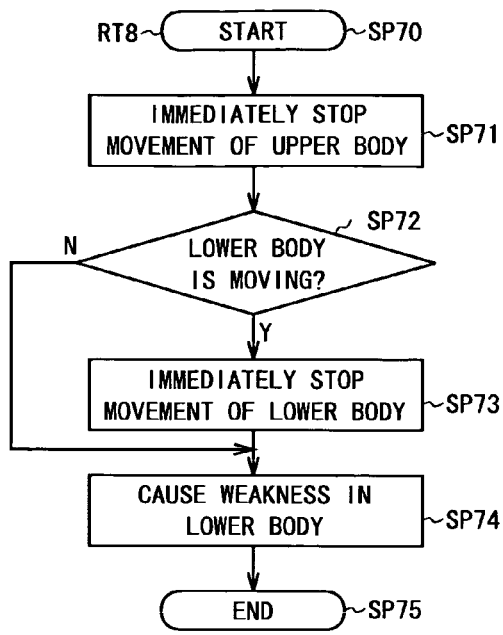
FIG. 32 is a flowchart showing a first procedure for countermeasures for lower body in the emergent stage.

Furthermore, when countermeasures selected in step SP42 of the countermeasure selection/implementation procedure RT5 (FIG. 26) are countermeasures against the "case where the safety level of any safe space of the lower body reaches the emergent stage" (countermeasures described in "emergent stage" of the second countermeasure table 91 shown in FIG. 28) and the position of the safe space in the emergent stage is not at the back of the knee joint mechanisms 38 shown by the arrow PO$_1$ in FIG. 14, the countermeasure creation unit 73B immediately stops the movement of the whole body of the robot 1 without taking the body protection into consideration, based on a first procedure RT8 for countermeasures for lower body in the emergent stage shown in FIG. 32.

That is, when countermeasures against the "case where the safety level of any safe space of the lower body other than the back side of the knee joint mechanisms 38 reaches the emergent stage" are selected in step SP42 of the countermeasure selection/implementation procedure RT5 (FIG. 26), the process goes on to step SP43 where the countermeasure creation unit 73B starts the first lower-body emergent-stage countermeasure procedure RT8 (FIG. 31) from step SP70. In next step SP71, the countermeasure creation unit 73B sends to the action determination unit 71 (FIG. 6) a command instructing to immediately stop the movement of all joint mechanisms (neck joint mechanism 13, shoulder joint mechanisms 20, elbow joint mechanisms 24, and waist joint mechanism 44) of the upper body of the robot 1.

Thus the action determination unit 71 sends an action signal S11 to the action creation unit 72 according to this command. The action creation unit 72 controls the relevant actuators $A_1$ to $A_{11}$ according to this action signal S11 so as to immediately stop the movement of all joint mechanisms of the upper body of the robot 1.

Then the process goes on to step SP72 where the countermeasure creation unit 73B determines whether the robot 1 is moving any joint mechanisms (hip joint mechanisms 36, knee joint mechanisms 38 and ankle joint mechanisms 41) of the lower body. When a negative result is obtained, the process goes on to step SP74. When an affirmative result is obtained, the process goes on to step SP73 where the countermeasure creation unit 73B sends to the action determination unit 71 a command instructing to immediately stop the movement of the joint mechanisms of the lower body.

Thus the action determination unit 71 sends an action signal S11 to the action creation unit 72 according to this command. The action creation unit 72 controls the relevant actuators $A_{12}$ to $A_{17}$ according to this action signal S11 so as to immediately stop the movement of all joint mechanisms of the lower body of the robot 1.

In step SP74, the countermeasure creation unit 73B sends to the action determination unit 71 a command instructing to cause weakness in all joint mechanisms of the lower body of the robot 1. Thus the action determination unit 71 sends an action signal S11 to the action creation unit 71 according to this command. The action creation unit 72 controls the relevant actuators $A_{12}$ to $A_{17}$ according to this action signal S11 so as to cause weakness in all joint mechanisms of the lower body of the robot 1 (so that the output torque becomes "0").

Then the process goes on to step SP75 where the countermeasure creation unit 73B terminates this first lower-body emergent-stage countermeasure procedure RT8.

Figure 33:
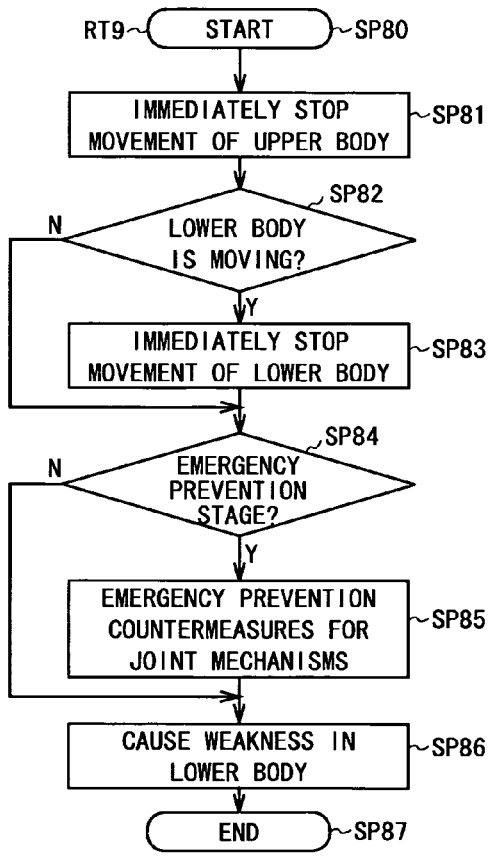
FIG. 33 is a flowchart showing a second procedure for countermeasures for lower body in the emergent stage.

Furthermore, in a case where countermeasures selected in step SP42 of the countermeasure selection/implementation procedure RT5 (FIG. 26) are countermeasures against the "case where the safety level of any safe space of the lower body reaches the emergent stage" (countermeasures described in "emergent stage" of the second countermeasure table 91 shown in FIG. 28) and the position of the safe space in the emergent stage is at the back of the knee joint mechanisms 38, the countermeasure creation unit 73B immediately stops the movement of the whole body of the robot 2 without considering the body protection based on a second procedure RT9 for countermeasures for lower body in the emergent stage shown in FIG. 33 and then takes a necessary preventative action.

That is, when the countermeasures against the "case where the safety level of the safe space at the back of the joint mechanisms 38 of the lower body reaches the emergent stage" are selected in step SP42 of the countermeasure selection/implementation procedure RT5 (FIG. 26), the process goes on to step SP43 where the countermeasure creation unit 73B starts the second lower-body emergent-stage countermeasure procedure RT9 (FIG. 33) from step SP80. Then the countermeasure creation unit 73B executes the steps SP81 to SP83 as in the case of steps SP71 to SP73 of the first lower-body emergent-stage countermeasure procedure RT8 described above with reference to FIG. 32.

Figure 10:
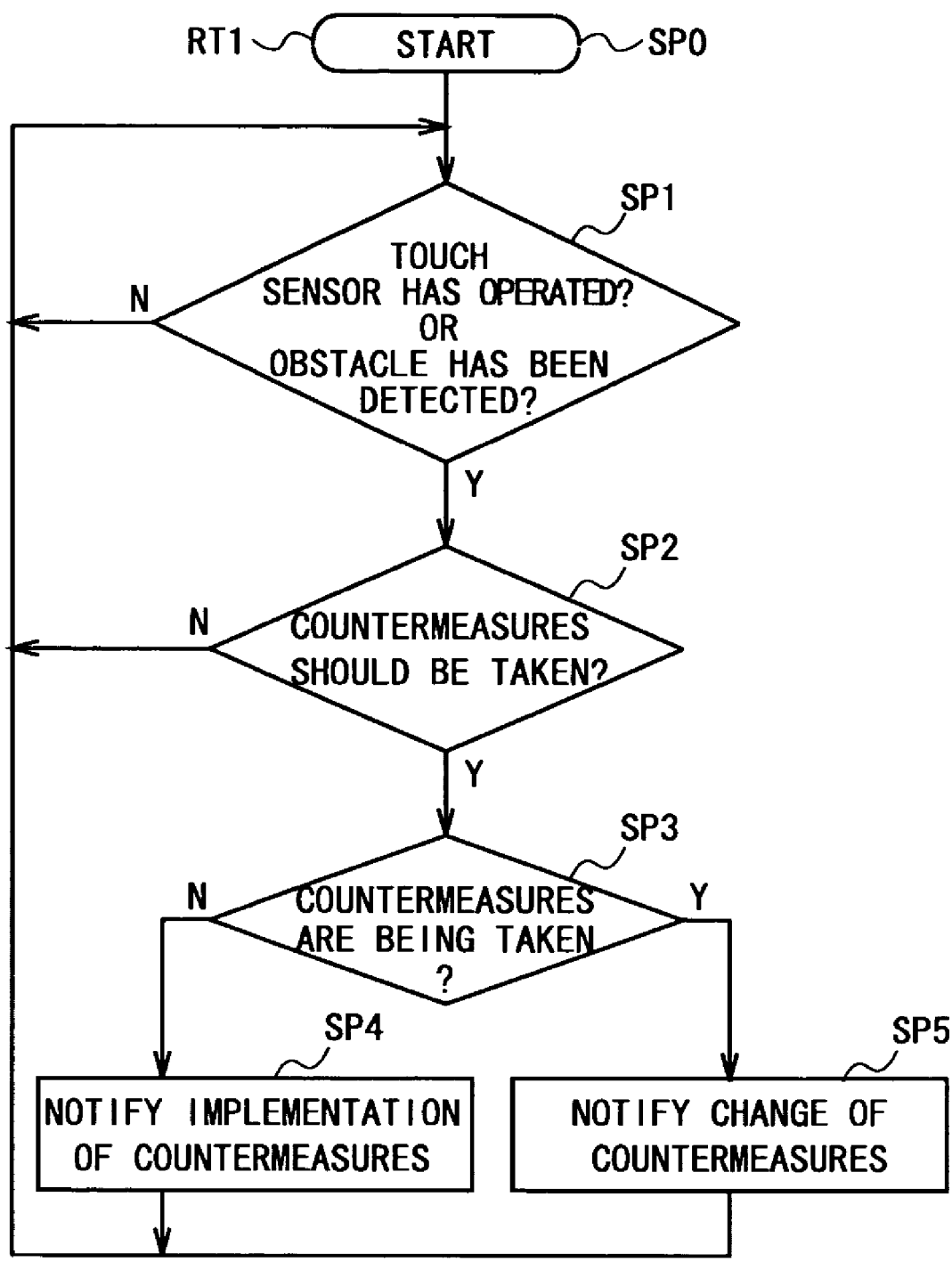
FIG. 10 is a flowchart showing a procedure for safety monitoring.

The process goes on to step SP84 where the countermeasure creation unit 73B determines the safety level of the safe space having the safety level status and determines whether the safety level is in the "emergency prevention stage", based on the same process described in step SP2 of the safety monitoring procedure RT1 (FIG. 10).

When a negative result is obtained in step SP84, the process goes on to step SP86. When an affirmative result is obtained, on the contrary, the process goes on to step SP85 where the countermeasure creation unit 73B obtains a parameter value $p_1$, $p_2$ described in the "emergency prevention amount" of the first safety management table 85 described above with reference to FIG. 22 and an axis (knee pitch axis 37 (FIG. 3)) to increase/decrease the volume of the safe space at the back of the knee joint mechanism 38, which is described in "relevant joint" of the first safety management table 85, and sends to the action determination unit 71 (FIG. 6) a command instructing to cause the robot 1 to take an emergency preventative action by moving the axis (knee pitch axis 37) by the amount of the parameter value $p_1$, $p_2$.

Figure 34:
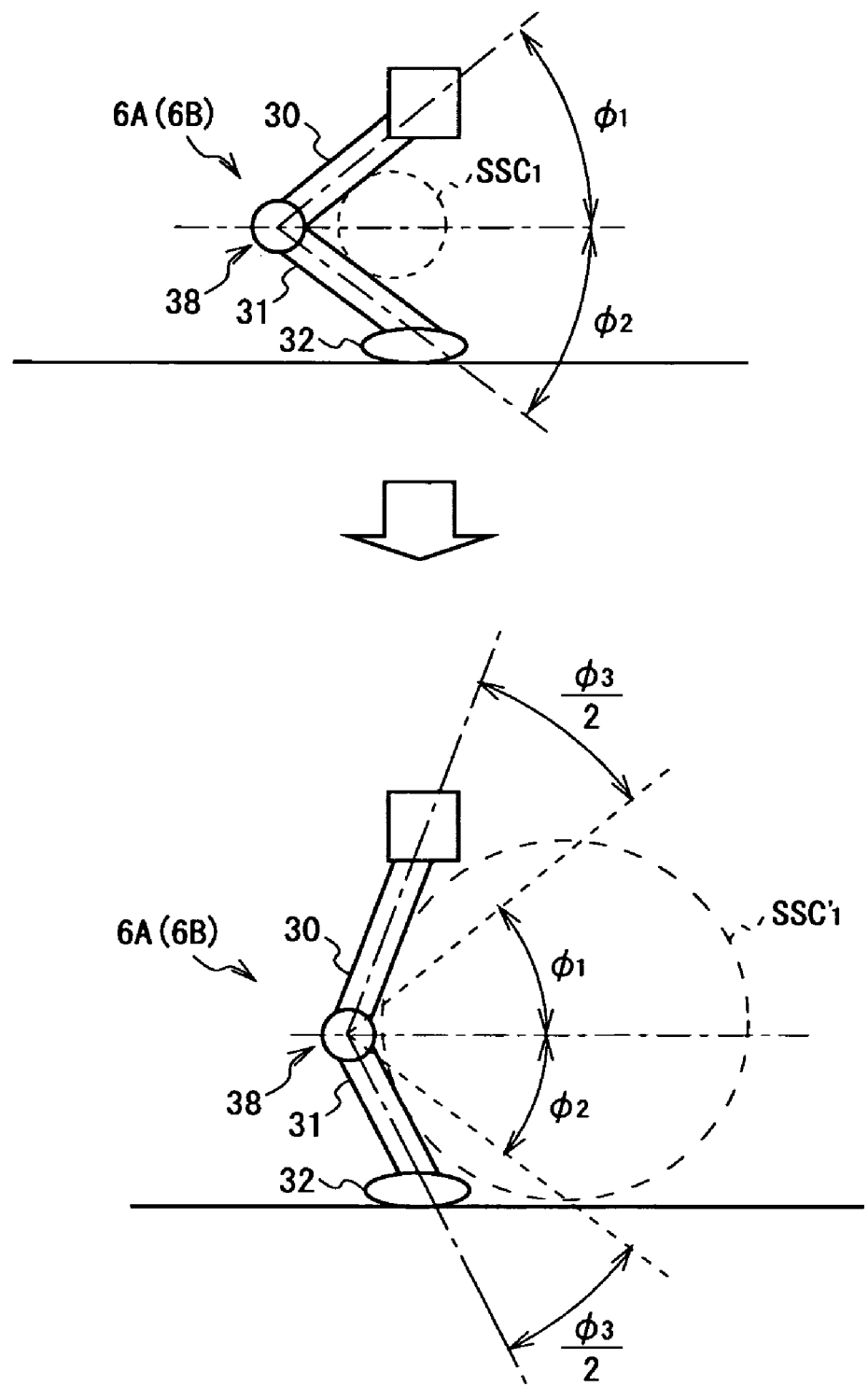
FIG. 34 is a conceptual view explaining an emergency preventative action of the ankle joint mechanisms of the robot.

Thus the action determination unit 71 sends an action signal S11 to the action creation unit 72 according to this command. The action creation unit 72 drives the relevant actuators $A_{15}$ according to this action signal S11 so as to open the hip joint mechanisms 38 as shown in FIG. 34.

It should be noted that the action creation unit 72 drives not only the actuators $A_{15}$ of the knee joint mechanisms 38 but also the relevant actuators $A_{12}$ to $A_{14}$ of the hip joint mechanisms 36 and the relevant actuators $A_{16}$ and $A_{17}$ of the ankle joint mechanisms 41 at the same time so as to add and output a half of the output angle $\phi_3$ for the emergency preventative action of the knee joint mechanisms 38 to both the bending angle $\phi_1$ on the thigh block 30 side and the bending angle $\phi_2$ on the shin block 31 side. By doing so, the robot 1 is able to reduce a possibility of an accident where the robot 1 falls down due to the emergency preventative action of the knee joint mechanisms 38 while standing.

Then the countermeasure creation unit 73B causes weakness in all joint mechanisms of the lower body of the robot 1 in step SP86, as in the case of step SP74 of the first lower-body emergent-stage countermeasure procedure RT8 (FIG. 32). Then the process goes on to step SP87 where the countermeasure creation unit 73B terminates this second lower-body emergent-stage countermeasure procedure RT9.

Figure 35:
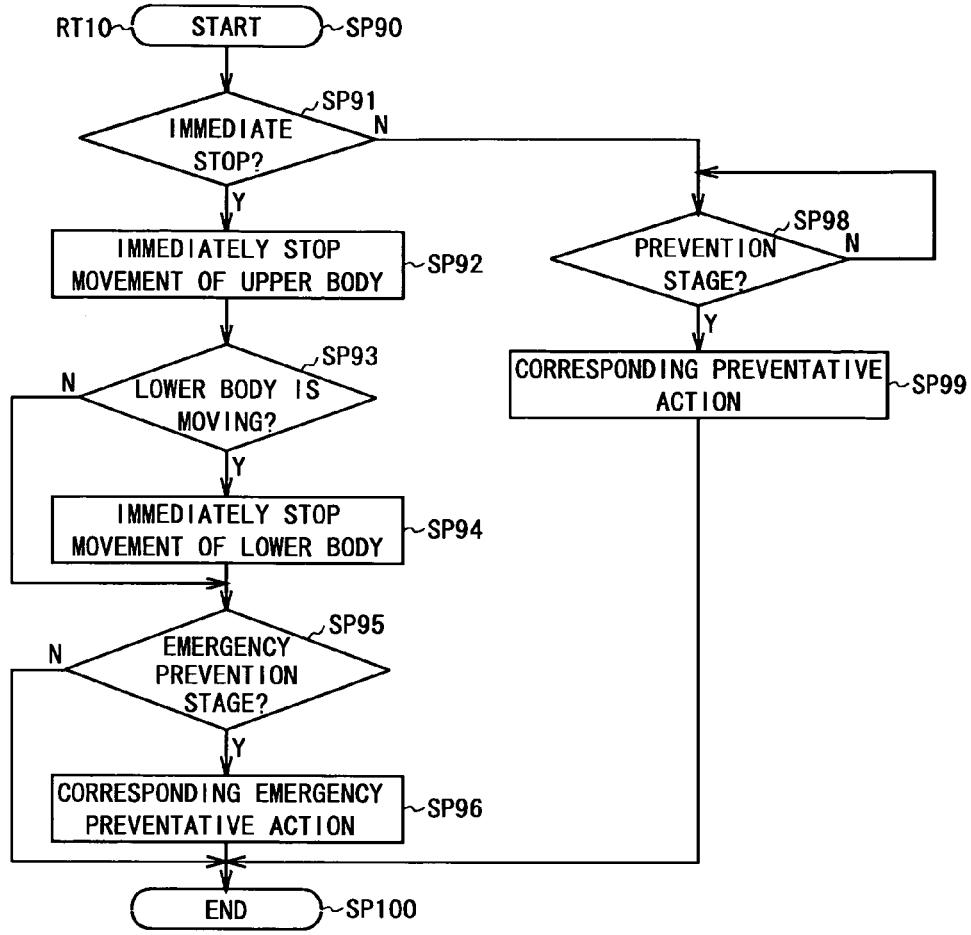
FIG. 35 is a flowchart showing a procedure for countermeasures for surroundings in the emergent stage.

Furthermore, in a case where countermeasures selected in step SP42 of the countermeasure selection/implementation procedure RT5 are countermeasures against the "case where the safety level of the safe space formed with surroundings reaches the emergent stage" (countermeasures described in "emergent stage" of the third countermeasure table shown in FIG. 29), the countermeasure creation unit 73B immediately stops the movement of the robot 1 without considering the body protection or continues the current action of the robot 1 while avoiding the obstacle, based on a procedure RT10 for countermeasures for surroundings in the emergent stage shown in FIG. 35.

That is, when countermeasures against the "case where the safety level of the safe space formed with surroundings reaches the emergent stage" are selected in step SP42 of the countermeasure selection/implementation procedure RT5 (FIG. 26), the process goes on to step SP43 where the countermeasure creation unit 73B starts this surrounding emergent-stage countermeasure procedure RT10 (FIG. 35) from step SP90. In next step SP91, the countermeasure creation unit 73B determines whether to immediately stop the robot 1, based on the priority of the current action and the existence or absence of a preventative route.

When the robot 1 may not continue the current action or when no preventative method exists, the process goes on to step SP92 where the countermeasure creation unit 73B executes steps SP92 to SP94 as in the case of steps SP81 to SP83 of the second lower-body emergent-stage countermeasure procedure RT9 described above with reference to FIG. 33.

The process goes on to step SP95 where the countermeasure creation unit 73B detects the safety level of the safe space formed with surroundings and determines whether the safety level is in "emergency prevention stage", as in the case of step SP2 of the safety monitoring procedure RT1 (FIG. 10).

Then when a negative result is obtained in step SP95, the process goes on to step SP100. When an affirmative result is obtained, on the contrary, the process goes on to step SP96 where the countermeasure creation unit 73B obtains, if necessary according to the current sistatus, a parameter value $p_3$ described in the "emergency prevention amount" of the third safety management table 87 described above with reference to FIG. 24, and sends to the action determination unit 71 a command instructing to cause the robot 1 to take the corresponding emergency preventative action. The action determination unit 71 sends an action signal S11 to the action creation unit 72 according to this command. The action creation unit 72 controls the relevant actuators $A_1$ to $A_{17}$ according to the action signal S11 so as to make the robot 1 take the emergency preventative action.

It should be noted that such emergency preventative action includes movement of an obstacle 100 with hands as shown in FIG. 36A when the obstacle 100 does not move and the fall of the robot 1 so as to avoid an obstacle 100 as shown in FIG. 36B when the obstacle 100 is coming near the robot 1.

Then the process goes on to step SP100 where the countermeasure creation unit 73B terminates the surrounding emergent-stage countermeasure procedure RT10.

On the other hand, when it is determined in step SP91 that the robot should continue the current action or that a preventative method exists, the process goes on to step SP98 where the countermeasure creation unit 73B waits that the safety level enters in the "emergency prevention stage" while repeatedly detecting the safety level of the safe space formed with surroundings as in the case of step SP2 of the safety monitoring procedure RT1 (FIG. 10).

When the safety level of the safe space formed with surroundings enters in the "emergency prevention stage" and therefore an affirmative result is obtained in step SP98, the process goes on to step SP99 where the countermeasure creation unit 73B sends to the action determination unit 71 a command instructing to cause the robot 1 to continue the current action while avoiding the obstacle. The action determination unit 71 sends an action signal S11 to the action creation unit 72 according to this command. The action creation unit 72 controls the relevant actuators $A_1$ to $A_{17}$ according to this action signal S11 so as to cause the robot 1 to take the preventative action.

It should be noted that, as such preventative action for the walking robot 1, for example, the robot 1 avoids the obstacle as shown in FIGS. 37A and 37B, the robot 1 bends himself forward so as to avoid the obstacle 101 as shown in FIGS. 38A and 38B, or the robot 1 moves a part of the body (for example, arm units 5A and 5B) so as to avoid the obstacle 102 as shown in FIGS. 39A and 39B.

Then the process goes on to step SP100 where the countermeasure creation unit 73B terminates the surrounding emergent-stage countermeasure procedure RT10.

As described above, the countermeasure creation unit 73 causes the robot 1 to take countermeasures according to the position of an operating touch sensor 63 and the volume of safe space of this time so that the robot 1 can resume the original action sooner as the volume is larger (that is, so as to reduce the decrease of the working efficiency of the robot 1 due to countermeasures) while keeping the safety of a user.

That is, in a case of the ignorance stage where the obtained volume of the safe space is large, no countermeasures are implemented even the touch sensor 63 operates. In a case of the warning stage where the obtained volume of the safe space is smaller than the above, countermeasures are implemented while keeping safety with considering the body protection of the robot 1, resulting in preventing the necessity of wasteful time for recovery of the robot 1 from the lying state (for standing up) in addition to the prevention of damages of the body of the robot 1, thereby preventing the decrease of the working efficiency of the robot 1.

In addition, in a case of the emergent stage where the volume of the safe space is smaller than that in the warning stage, the working efficiency of the robot 1 may decrease due to a fall etc., but countermeasures are implemented, taking safety seriously more than body protection. Different countermeasures are selected depending on whether safe space having a safety level status is in the upper body or lower body. Furthermore, in a case of the emergency prevention stage where the volume of safe space is much smaller than that of the emergent stage, the working efficiency is worsen because time is required for an emergency preventative action in addition to a fall, but the safety level status is eliminated with the highest priority.

By selecting different countermeasures depending on the volume of safe space at a time of detecting a safety level status, the robot 1 is capable of preventing decrease of working efficiency while keeping safety, resulting in previously preventing deterioration of entertainment property as an entertainment robot due to the occurrence of safety level status in danger.

Figure 41:
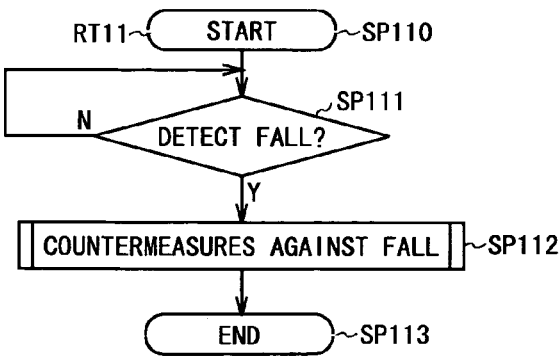
FIG. 41 is a flowchart showing a procedure for fall monitoring.

On the other hand, the countermeasure creation unit 73B executes a procedure RT11 for fall monitoring shown in FIG. 41 in parallel to the countermeasure selection/implementation procedure RT5 described above with reference to FIG. 26, in step SP12 of the countermeasure creation procedure RT2 (FIG. 11), thereby executing fall monitoring while the robot 1 is taking countermeasures and controlling the countermeasures of the robot 1 when the robot 1 falls down.

That is, when the process enters in step SP12 of the countermeasure creation procedure RT2, the countermeasure creation unit 73B starts the fall monitoring procedure RT11 from step SP110 in parallel to the countermeasure selection/implementation procedure RT5 (FIG. 23). In next step SP111, the countermeasure creation unit 73B always monitors based on the acceleration signal S2B (FIG. 5) given from the acceleration sensor 65 (FIG. 5) whether the robot 1 has started to fall down.

Figure 42:
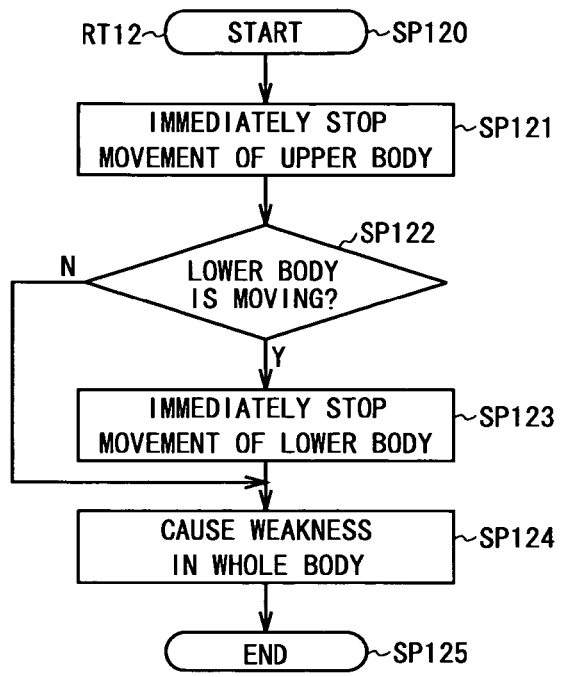
FIG. 42 is a flowchart showing a procedure for controlling countermeasures against a fall.

When an affirmative result is obtained in step SP111, the process goes on to step SP112 where the countermeasure creation unit 73B causes weakness in the whole body of the robot 1 based on a procedure RT12 for controlling countermeasures against a fall shown in FIG. 42.

That is, when the process goes on to step SP112 of the fall monitoring procedure RT11, the countermeasure creation unit 73B starts this countermeasure-against-fall control procedure RT12 from step SP120. The countermeasure creation unit 73B executes steps SP121 to SP123 as in the case of steps SP81 to step SP83 of the second lower-body emergent-stage countermeasure procedure RT9 described above with reference to FIG. 33, so as to immediately stop the movement of all joint mechanisms (neck joint mechanism 13, shoulder joint mechanisms 20, elbow joint mechanisms 24 and waist joint mechanism 44) of the upper body of the robot 1 and all joint mechanisms (hip joint mechanisms 36, knee joint mechanisms 38, and ankle joint mechanisms 41) of the lower body of the robot 1.

Then the process goes on to step SP124 where the countermeasure creation unit 73B sends to the action determination unit 71 a command instructing to cause weakness in the whole body of the robot 1. The action determination unit 71 sends an action signal S22 to the action creation unit 71 according to this command. The action creation unit 72 controls all actuators $A_1$ to $A_{17}$ according to the action signal S11 so as to cause weakness in all joint mechanisms of the robot 1 (that is, so that the output torque becomes "0").

The process goes on to step SP125 where the countermeasure creation unit 73B terminates this countermeasure-against-fall control procedure RT12, and returns back to the countermeasure creation procedure RT2 (FIG. 11), and then goes on to step SP14 of this countermeasure creation procedure RT2.

When a fall is detected while the robot 1 is taking countermeasures, the countermeasure creation unit 73B causes weakness in the whole body of the robot 1, thus making it possible to reduce robot's damages caused by the fall.

Figure 43:
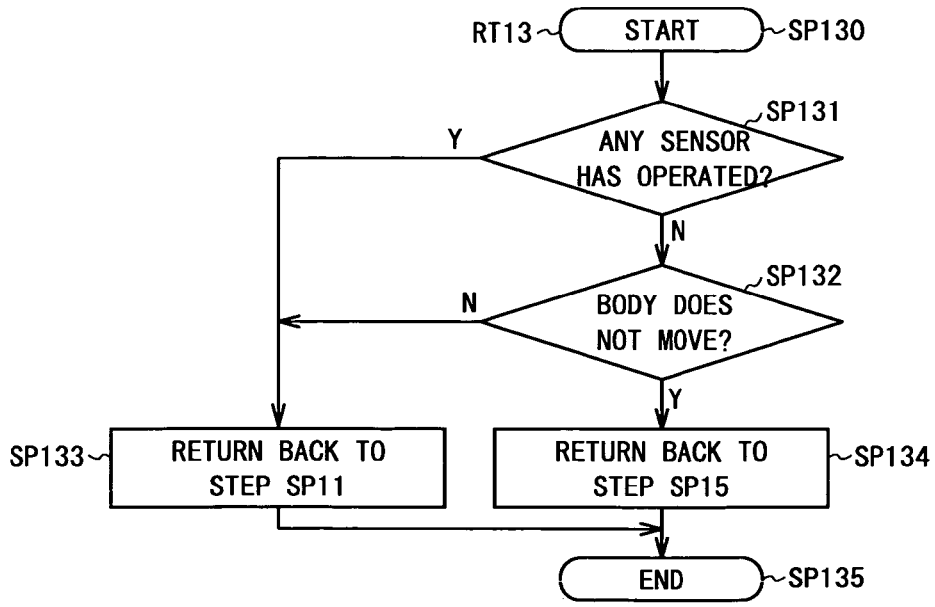
FIG. 43 is a flowchart showing a procedure for determining completion of countermeasures.

(3-3-3) Processing of the Countermeasure Creation Unit 73B in Countermeasure-Completion Determination Step On the other hand, the countermeasure creation unit 73B executes step SP14 of the countermeasure creation procedure RT2 (FIG. 11) based on a procedure RT13 for determining completion of countermeasures shown in FIG. 43.

That is, when the process enters in step SP14 of the countermeasure creation procedure RT2, the countermeasure creation unit 73B starts this countermeasure-completion determination procedure RT13 from step SP130. In next step SP131, the countermeasure creation unit 73B determines whether any touch sensor 63 is operating or whether an obstacle is detected by the image recognition process, based on the pressure signals S1C given from the touch sensors 63 and the state signal S10 from the state recognition unit 70.

When an affirmative result is obtained in step SP131, the process goes on to step SP133. When a negative result is obtained, on the contrary, the process goes on to step SP132 where the countermeasure creation unit 73B determines based on the acceleration signal S2B given from the acceleration sensor 65 (FIG. 5) whether the robot 1 does not move (the robot 1 is at rest).

When a negative result is obtained in step SP132, the process goes on to step SP133, returns back to step SP11 of the countermeasure creation procedure RT2, and then terminates this countermeasure-completion determination procedure RT13 (step SP135). When an affirmative result is obtained in step SP132, on the contrary, the process goes on to step SP134 and then to step SP15 of the countermeasure creation procedure RT2, and then terminates this countermeasure-completion determination procedure RT13 (step SP135).

As described above, after starting countermeasures, the countermeasure creation unit 73B controls the movement of the robot 1 so as to finish the countermeasures when all touch sensors 63 stop and the robot 1 stops its movement.

(4) Operation and Effects of this Embodiment

According to the above configuration, the robot 1 detects the contents and safety level (stage) of a safety level status in joint mechanisms, such as insertion of a user's finger or contact with an external object, with the touch sensors 63 ($63F_1$ to $63F_5$, $63T_1$ to $63T_4$) arranged at certain positions of the body for safeguards and the image recognition process, and takes appropriate countermeasures based on the detected contents and safety level of the safety level status.

Therefore, the robot 1 can previously and effectively prevent such accidents that a user gets injured by inserting his/her finger into a joint mechanism by mistake or that the body or an external object is broken by contacting of the body with the external object.

Further, in such a case, the robot 1 takes countermeasures against the safety level status, with taking own body protection into consideration, thus making it possible to effectively prevent damages of the body due to a fall or the like.

Figure 40:
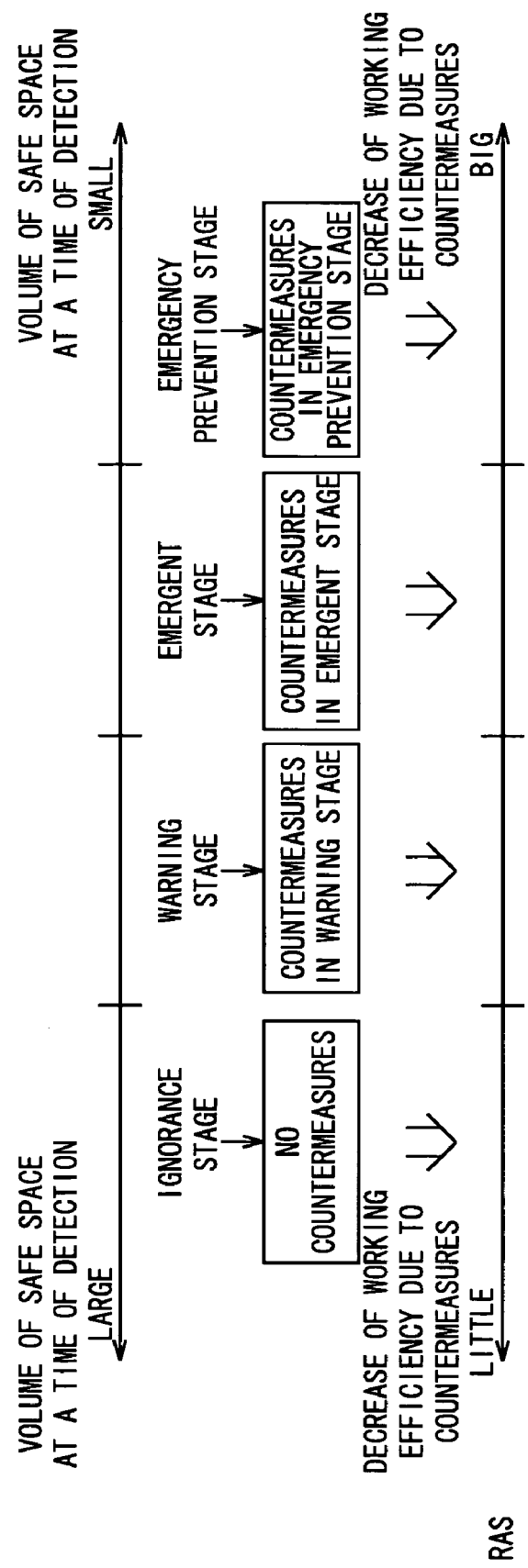
FIG. 40 is a conceptual view explaining the volume of safe space and decrease of working efficiency due to countermeasures.

Further, when a safety level status in danger is detected, as described in FIG. 40, the robot 1 not only stops the movement of the robot 1 but also takes countermeasures so as to resume the original action as soon as possible, according to the safety level of the safe space having the safety level status in danger, thus making it possible to reduce the decrease of the working efficiency of the robot 1 due to the safety level status in danger.

According to the above configuration, by detecting a safety level status such as insertion of a user's finger into a joint mechanism with the touch sensors 63 ($63F_1$ to $63F_5$, $63T_1$ to $63T_4$) arranged at appropriate positions of the body for safeguards, and implementing appropriate countermeasures according to the detected safety level status, such accidents that a user gets injured by mistake or that the body and/or an external object is broken due to contact of the body with the external object can be effectively prevented, thus making it possible to realize the robot capable of offering significantly improved safety.

(5) Other Embodiments

In the above-described embodiment, this invention is applied to the humanoid robot 1 constructed as shown in FIG. 1 to FIG. 5. This invention, however, is not limited to this and can be widely applied to various robot apparatuses having different constructions.

Figure 7:
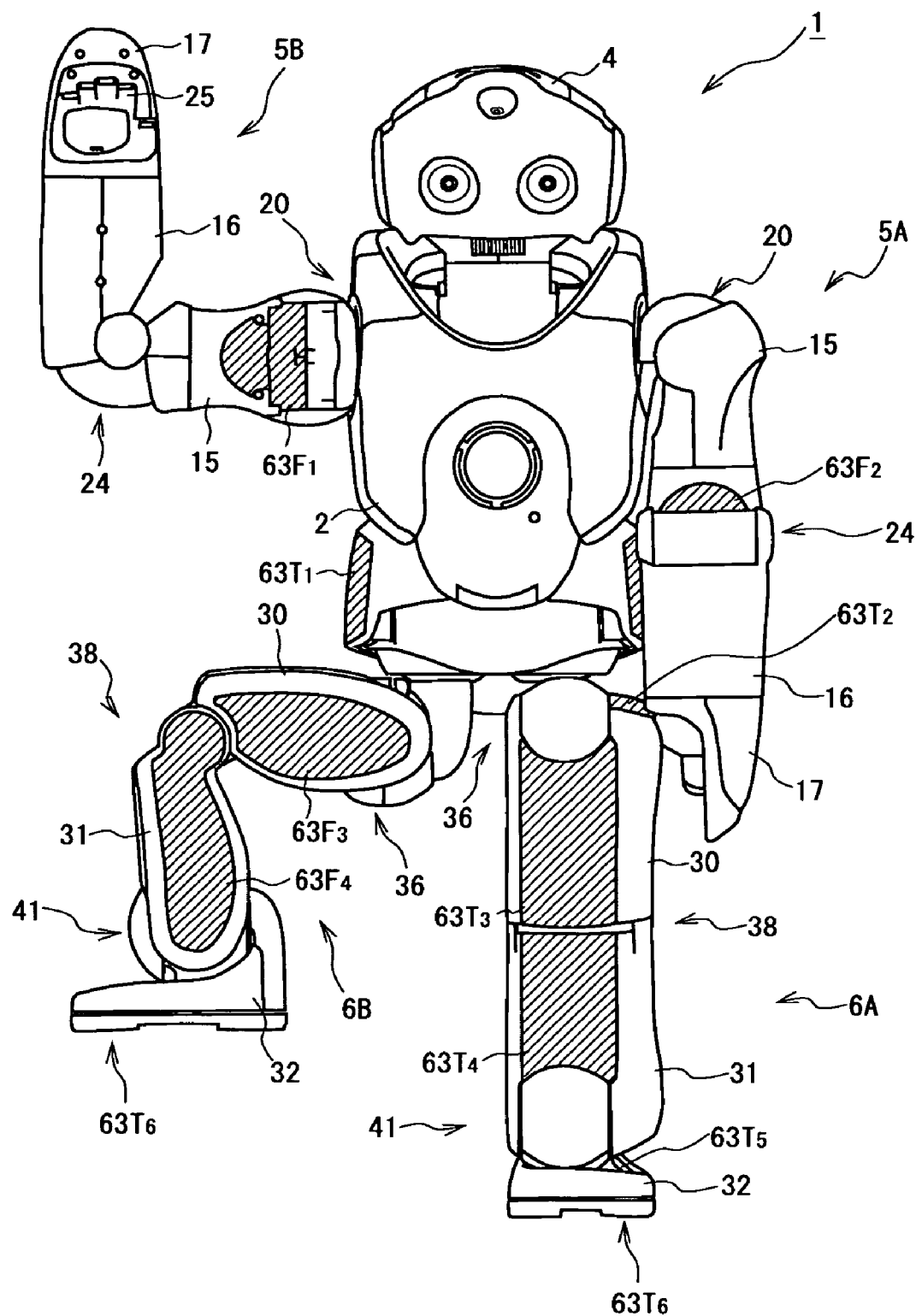
FIGS. 7 and 8 are front views explaining positions of safeguard touch sensors.
Figure 8:
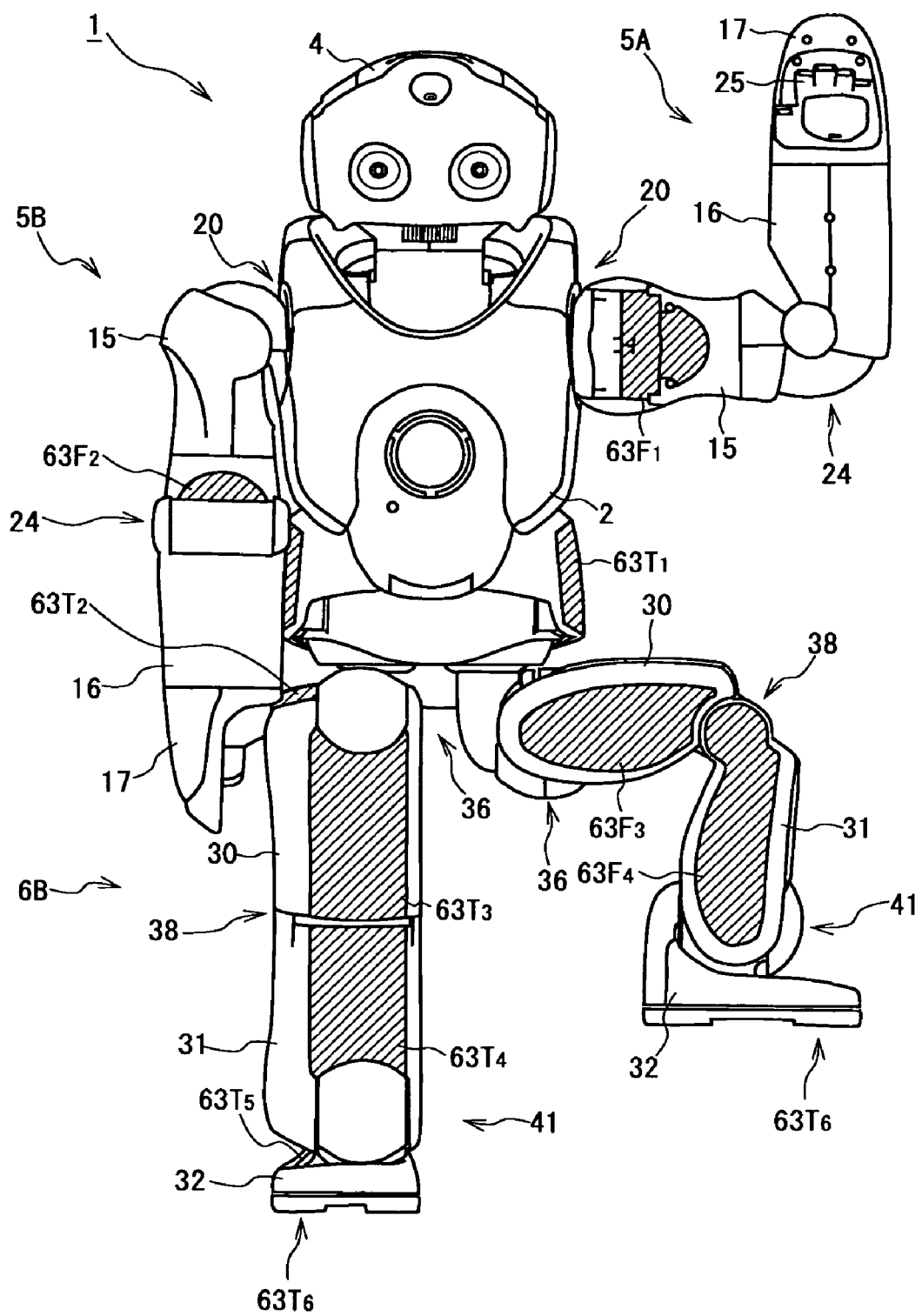
Figure 9:
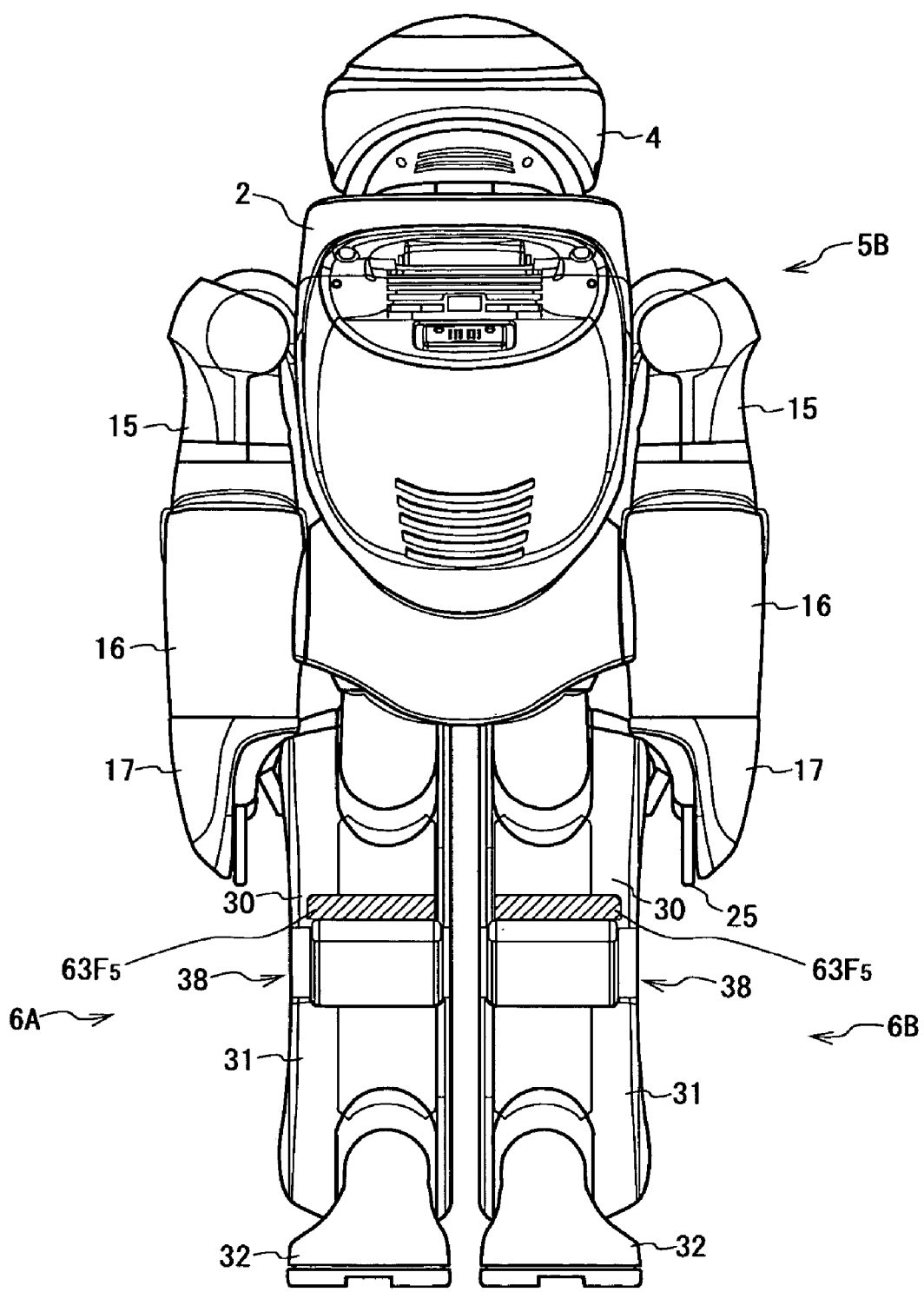
FIG. 9 is a back view explaining positions of safeguard touch sensors.

Further, in the above-described embodiment, the safeguard touch sensors 63 are arranged on the robot 1 as described in FIG. 7 to FIG. 9. This invention, however, is not limited to this and touch sensors can be arranged at other positions instead of or in addition to the above positions.

Furthermore, in the above-described embodiment, the touch sensors 63, the CCD cameras 60A and 60B, and the state recognition unit 70 serving as a software module for performing the image recognition process are applied as a safety level status detecting means for detecting whether a safety level status in danger is detected in safe space. This invention, however, is not limited to this and other various means can be widely applied according to definition of safe space.

Furthermore, in the above-described embodiment, the potential meters $P_1$ to $P_{17}$, the actuators $A_1$ to $A_{17}$ and the CCD cameras 60A and 60, and the state recognition unit 70 serving as a software module for performing the image recognition process are applied as a safety level detecting means for detecting the safety level of a safety level status. This invention, however, is not limited to this and other various means can be widely applied according to definition of safe space. For example, a distance sensor can be applied as a means for detecting a safety level of safe space formed by a robot and surroundings.

Furthermore, in the above-described embodiment, the safety management unit 73 as a control means for performing a control process to implement countermeasures according to a safety level status detected by a safety level status detecting means and the safety level of the safety level status detected by a safety level detecting means is arranged separately from the action determination unit 71. The functions of the safety management unit 73, however, can be installed in the action determination unit 71.

Furthermore, in the above-described embodiment, countermeasures are implemented after a safety level status in danger is detected. This invention, however, is not limited to this and a safety level status is predicated so that the robot can take countermeasures based on the prediction. As preventative countermeasures, the portions which contact a user are formed in a safety shape so that this shape can previously eliminate danger.

Furthermore, in the above described embodiment, the safety monitoring unit 73A of the safety management unit 73 calculates the size of a safe space definition circle $SSC_1$ with the equation (3) in step SP31 of the safety level determination procedure RT4 and determines the safety level based on the size. This invention, however, is not limited to this and the safety level of safe space can be directly obtained from the current angle $\theta$ by considering that the area a of the safe space definition circle $SSC_1$ and the current angle $\theta$ described in FIG. 20 are proportional to each other. In this case, relations between a current angle $\theta$ and a safety level can be stored as a table in the robot 1 so as to determine a safety level from this table and a current angle.

While there has been described in connection with the preferred embodiments of the invention, it will be obvious to those skilled in the art that various changed and modifications may be aimed, therefore, to cover in the appended claims all such changes and modifications as fall within the true spirit ad scope of the invention.

What is claimed is:

1. A movable robot apparatus comprising:
   safety level status detecting means for detecting a safety level status;
   safety level detecting means for detecting a safety level of said safety level status detected by said safety level status detecting means,
   wherein the safety level of the detected safety level status is determined by comparing the detected safety level status to a plurality of threshold values and grouping the detected safety level status as a function of the comparison result,
   wherein the safety level is a volume calculated as a function of a joint angle, a capability of the joint angle, a timing of a potential risk, and a planned action, and the volume is calculated as the area of one of a plurality of safe space definition circles,
      wherein the plurality of safe space definition circles include a safe space definition circle which contacts with a first link and a second link of one or more joint mechanisms, and a safe space definition circle which has a radius being a distance between the movable robot apparatus and an obstacle and a center being the movable robot apparatus; and
   control means for performing a control process so as to implement prescribed countermeasures according to said safety level status detected by said safety level status detecting means and said safety level detected by said safety level detecting means,
   wherein when the safety level increases, corresponding to a different safety level status, while the countermeasures are performed, the control means determines whether to maintain current countermeasures.

2. The robot apparatus according to claim 1,
   wherein a safe space is defined so as to correspond to each safety level status to be detected by said safety level status detecting means; and
   said safety level detecting means detects said safety level of said safety level status based on a volume of the safe space corresponding to the safety level status detected by said safety level status detecting means.

3. The robot apparatus according to claim 1,
   wherein said control means performs said control process so as to implement said countermeasures according to a position of said safety level status detected by said safety level status detecting means and said safety level of the safety level status.

4. The robot apparatus according to claim 3,
   wherein said control means performs said control process so as to implement different countermeasures depending on whether said position of said safety level status is in an upper body or a lower body of said robot apparatus.

5. The robot apparatus according to claim 1,
   wherein a priority is previously set according to a position of said safety level status and/or said safety level of the safety level status; and
   said control means, when said safety level status detecting means newly detects a safety level status with a higher priority while said control process to implement said countermeasures is performed, changes the control process so as to implement countermeasures against the safety level status newly detected.

6. A control method of a movable robot apparatus, comprising:
   a first step of detecting a safety level status and detecting a safety level of the safety level status detected;
   determining the safety level of the detected safety level status by comparing the detected safety level status to a plurality of threshold values and grouping the detected safety level status as a function of the comparison result,
   wherein the safety level is a volume calculated as a function of a joint angle, a capability of the joint angle, a timing of a potential risk, and a planned action, and the volume is calculated as the area of one of a plurality of safe space definition circles,
      wherein the plurality of safe space definition circles include a safe space definition circle which contacts with a first link and a second link of one or more joint mechanisms, and a safe space definition circle which has a radius being a distance between the movable robot apparatus and an obstacle and a center being the movable robot apparatus; and
   a second step of performing a control process so as to make said robot apparatus implement prescribed countermeasures according to said safety level status detected and said safety level detected,
   wherein when the safety level increases, corresponding to a different safety level status, while the countermeasures are performed, the control means determines whether to maintain current countermeasures.

7. The control method according to claim 6,
   wherein: safe space is defined so as to correspond to each safety level status; and in said first step, said safety level is detected based on a volume of the safe space corresponding to the safety level status.

8. The control method according to claim 6,
   wherein, in said second step, said control process is performed so as to make said robot apparatus implement said countermeasures according to a position of said safety level status detected and said safety level detected.

9. The control method according to claim 8,
wherein, in said second step, said control process is performed so as to make said robot apparatus implement different countermeasures depending on whether said position of said safety level status is in an upper body or a lower body of said robot apparatus.

10. The control method according to claim 6,
wherein a priority is previously set according to a position of said safety level status and/or said safety level of the safety level status; and in said second step, when a safety level status with a higher priority is newly detected while said control process to make said robot apparatus implement said countermeasures is performed, the control process is changed so as to make the robot apparatus implement countermeasures against the safety level status newly detected.

11. A movable robot apparatus comprising:
safety level status detecting means for detecting a safety level status; and
control means for performing a control process so as to implement prescribed countermeasures according to a position of said safety level status detected by said safety level status detecting means,
wherein the position of the detected safety level status is determined by comparing the detected safety level status to a plurality of threshold values and grouping the detected safety level status as a function of the comparison result,
wherein the safety level is a volume calculated as a function of a joint angle, a capability of the joint angle, a timing of a potential risk, and a planned action, and the volume is calculated as the area of one of a plurality of safe space definition circles,
wherein the plurality of safe space definition circles include a safe space definition circle which contacts with a first link and a second link of one or more joint mechanisms, and a safe space definition circle which has a radius being a distance between the movable robot apparatus and an obstacle and a center being the movable robot apparatus,
wherein when the safety level increases, corresponding to a different safety level status, while the countermeasures are performed, the control means determines whether to maintain current countermeasures.

12. A control method of a movable robot apparatus, comprising:
a first step of detecting a safety level status; and
a second step of performing a control process so as to make said robot apparatus implement prescribed countermeasures according to a position of said safety level status detected in said first step;
determining the position of the detected safety level status by comparing the detected safety level status to a plurality of threshold values and grouping the detected safety level status as a function of the comparison result,
wherein the safety level is a volume calculated as a function of a joint angle, a capability of the joint angle, a timing of a potential risk, and a planned action, and the volume is calculated as the area of one of a plurality of safe space definition circles,
wherein the plurality of safe space definition circles include a safe space definition circle which contacts with a first link and a second link of one or more joint mechanisms, and a safe space definition circle which has a radius being a distance between the movable robot apparatus and an obstacle and a center being the movable robot apparatus,
determining whether to maintain current countermeasures when the safety level increases, corresponding to a different safety level status, while the countermeasures are performed.

13. A robot apparatus having a plurality of movable units, comprising:
driving means for driving said movable units;
control means for controlling said driving means;
object detecting means for detecting an object;
action determination means for determining an action of said robot apparatus; and
safety level detecting means for detecting a safety level involving said object and said movable units,
wherein the safety level is a volume calculated as a function of a joint angle, a capability of the joint angle, a timing of a potential risk, and a planned action, and the volume is calculated as the area of one of a plurality of safe space definition circles,
wherein the plurality of safe space definition circles include a safe space definition circle which contacts with a first link and a second link of one or more joint mechanisms, and a safe space definition circle which has a radius being a distance between the robot apparatus and an obstacle and a center being the robot apparatus,
wherein said control means moves said movable units as a function of said safety level and said action determined by said action determination unit in order to mitigate or avoid danger,
wherein the action determined is a preprogrammed countermeasure corresponding to the detected safety level,
wherein when the safety level increases, corresponding to a different safety level status, while the countermeasures are performed, the action determination means determines whether to keep current countermeasures.

14. The robot apparatus according to claim 13,
wherein safe spaces are designated around the movable units.

15. A control method of a robot apparatus having a plurality of movable units, said control method comprising:
a first step of determining an action of said robot apparatus;
a second step of, when an object is detected, detecting safety level involving the object and said movable units,
wherein the safety level is a function of a capability of a joint angle, a timing of a potential risk, and available countermeasures; and
a third step of moving said movable units based on said safety level detected and said action determined to mitigate or avoid danger,
wherein the safety level is a volume calculated as a function of a joint angle, a capability of the joint angle, a timing of a potential risk, and a planned action, and the volume is calculated as the area of one of a plurality of safe space definition circles,
wherein the plurality of safe space definition circles include a safe space definition circle which contacts with a first link and a second link of one or more joint mechanisms, and a safe space definition circle which has a radius being a distance between the robot apparatus and an obstacle and a center being the robot apparatus,
determining whether to keep the action when the safety level increases, corresponding to a different action, while the action is being performed.

16. The control method according to claim 15,
wherein safe spaces are designated around the movable units.

* * * * *